(12) United States Patent
Lu et al.

(10) Patent No.: US 9,479,890 B2
(45) Date of Patent: *Oct. 25, 2016

(54) OPEN WIRELESS ARCHITECTURE (OWA) MOBILE CLOUD INFRASTRUCTURE AND METHOD

(71) Applicants: Michael Lu, Cupertino, CA (US); Dexi Lu, Cupertino, CA (US); Wei Lu, Cupertino, CA (US)

(72) Inventors: Michael Lu, Cupertino, CA (US); Dexi Lu, Cupertino, CA (US); Wei Lu, Cupertino, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/696,946

(22) Filed: Apr. 27, 2015

(65) Prior Publication Data
US 2015/0229713 A1    Aug. 13, 2015

Related U.S. Application Data

(63) Continuation-in-part of application No. 13/563,286, filed on Jul. 31, 2012, now Pat. No. 9,084,281.

(51) Int. Cl.
| | |
|---|---|
| *H04W 4/00* | (2009.01) |
| *H04W 52/02* | (2009.01) |
| *H04L 29/08* | (2006.01) |
| *H04W 84/12* | (2009.01) |
| *H04W 28/06* | (2009.01) |
| *H04W 12/08* | (2009.01) |

(52) U.S. Cl.
CPC ......... *H04W 4/003* (2013.01); *H04W 52/0251* (2013.01); *H04W 52/0261* (2013.01); *H04L 67/1095* (2013.01); *H04W 12/08* (2013.01); *H04W 28/06* (2013.01); *H04W 84/12* (2013.01)

(58) Field of Classification Search
CPC .................................................. H04W 4/003
USPC ........ 370/389, 352, 328, 338, 401; 455/408, 455/436, 445, 422.1
See application file for complete search history.

(56) References Cited

U.S. PATENT DOCUMENTS

| | | | | |
|---|---|---|---|---|
| 5,825,759 A * | 10/1998 | Liu | ......................... | H04W 8/06 370/331 |
| 7,782,848 B2 * | 8/2010 | Kalavade | ................ | H04L 63/08 370/389 |
| 7,965,693 B2 * | 6/2011 | Jiang | ....................... | H04L 63/08 370/338 |
| 8,095,175 B2 * | 1/2012 | Todd | ...................... | H04W 36/18 370/328 |
| 8,112,471 B2 * | 2/2012 | Wei | ..................... | H04L 67/1008 709/202 |
| 8,311,042 B2 * | 11/2012 | Nath | ................. | H04L 29/12028 370/395.3 |
| 8,340,667 B2 * | 12/2012 | Pan | ......................... | H04W 4/00 370/328 |
| 8,527,540 B2 * | 9/2013 | Wu | ....................... | G06F 17/241 707/783 |
| 8,527,640 B2 * | 9/2013 | Reisman | ........... | G06F 17/30873 709/227 |

(Continued)

*Primary Examiner* — Andrew Lai
*Assistant Examiner* — Andrew C Lee

(57) ABSTRACT

An advanced mobile terminal converging multiple wireless transmission technologies by utilizing a cost-effective and spectrum-efficient mobile cloud solution by introducing Virtual Mobile Server (VMS) and Virtual Register and Call Switch (VR/CS) systems and methods based on the innovative open wireless architecture (OWA) technology platform, and the mobile terminal shared with other mobile cloud clients including computer terminal and television terminal fully synchronized through the VMS for the integrated smart home and smart office platform for the enterprise mobility solutions between home and enterprise.

20 Claims, 7 Drawing Sheets

(56) References Cited

U.S. PATENT DOCUMENTS

| | | | | |
|---|---|---|---|---|
| 9,084,281 B2* | 7/2015 | Lu | | H04W 84/00 |
| 2007/0287498 A1* | 12/2007 | Wang | | G06Q 10/087 |
| | | | | 455/556.1 |
| 2007/0288548 A1* | 12/2007 | Creamer | | H04L 67/1095 |
| | | | | 709/202 |
| 2009/0037523 A1* | 2/2009 | Kolke | | H04L 67/1095 |
| | | | | 709/203 |
| 2009/0198702 A1* | 8/2009 | Novik | | G06F 17/30174 |
| 2010/0027552 A1* | 2/2010 | Hill | | H04L 12/66 |
| | | | | 370/401 |
| 2011/0055588 A1* | 3/2011 | DeHaan | | G06F 1/3209 |
| | | | | 713/189 |
| 2011/0103266 A1* | 5/2011 | Andreasen | | H04L 12/1403 |
| | | | | 370/259 |
| 2011/0314145 A1* | 12/2011 | Raleigh | | H04L 41/0893 |
| | | | | 709/224 |
| 2012/0020252 A1* | 1/2012 | Bouthemy | | H04L 12/66 |
| | | | | 370/259 |
| 2012/0069131 A1* | 3/2012 | Abelow | | G06Q 10/067 |
| | | | | 348/14.01 |
| 2012/0131184 A1* | 5/2012 | Luna | | H04W 28/14 |
| | | | | 709/224 |
| 2012/0221955 A1* | 8/2012 | Raleigh | | H04M 15/00 |
| | | | | 715/736 |
| 2013/0336319 A1* | 12/2013 | Liu | | H04L 47/621 |
| | | | | 370/390 |

* cited by examiner

Architecture of Mobile Cloud Wireless Mobile Terminal

Call Processing Management in Virtual Register and Call Switch (VR/CS) with VMS

Virtual Mobile Server as Mobile Cloud Server

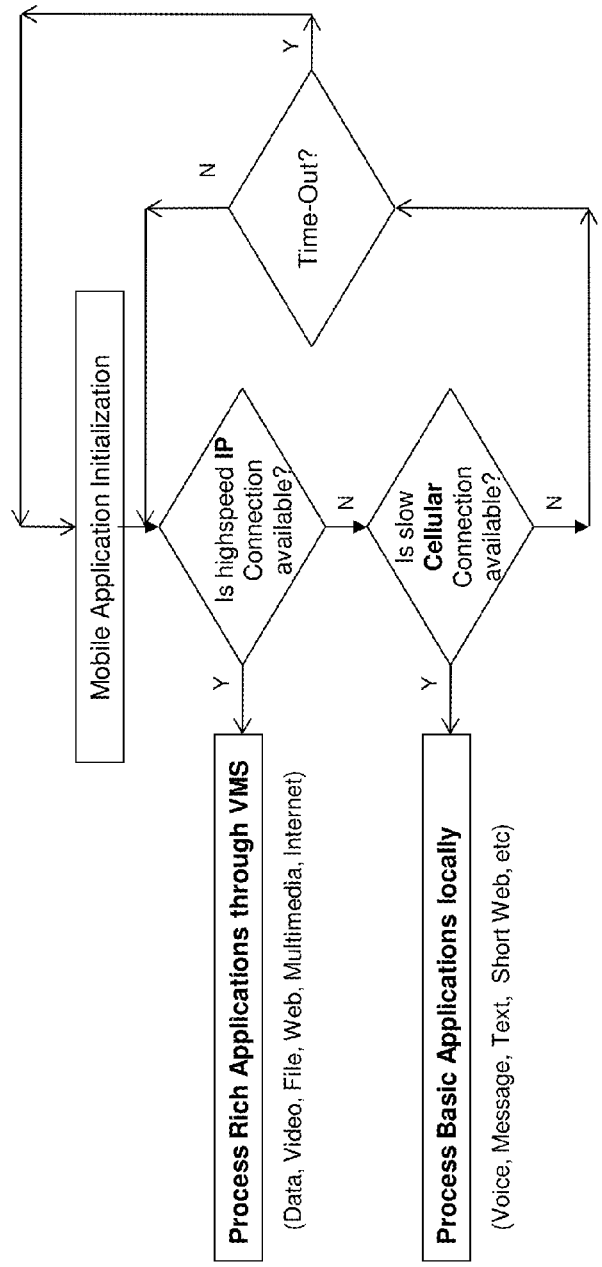
| OWA SIG Header | OWA Signal Processing Information | OWA SIG End |
| OWA APP Header | OWA Application Processing Information | OWA APP End |
| OWA NET Header | OWA Networking Processing Information | OWA NET End |
FIG.5 Transmission Framework of Mobile Cloud OWA Interface
FIG.6 OWA Application Optimizer in Mobile Cloud Terminal System

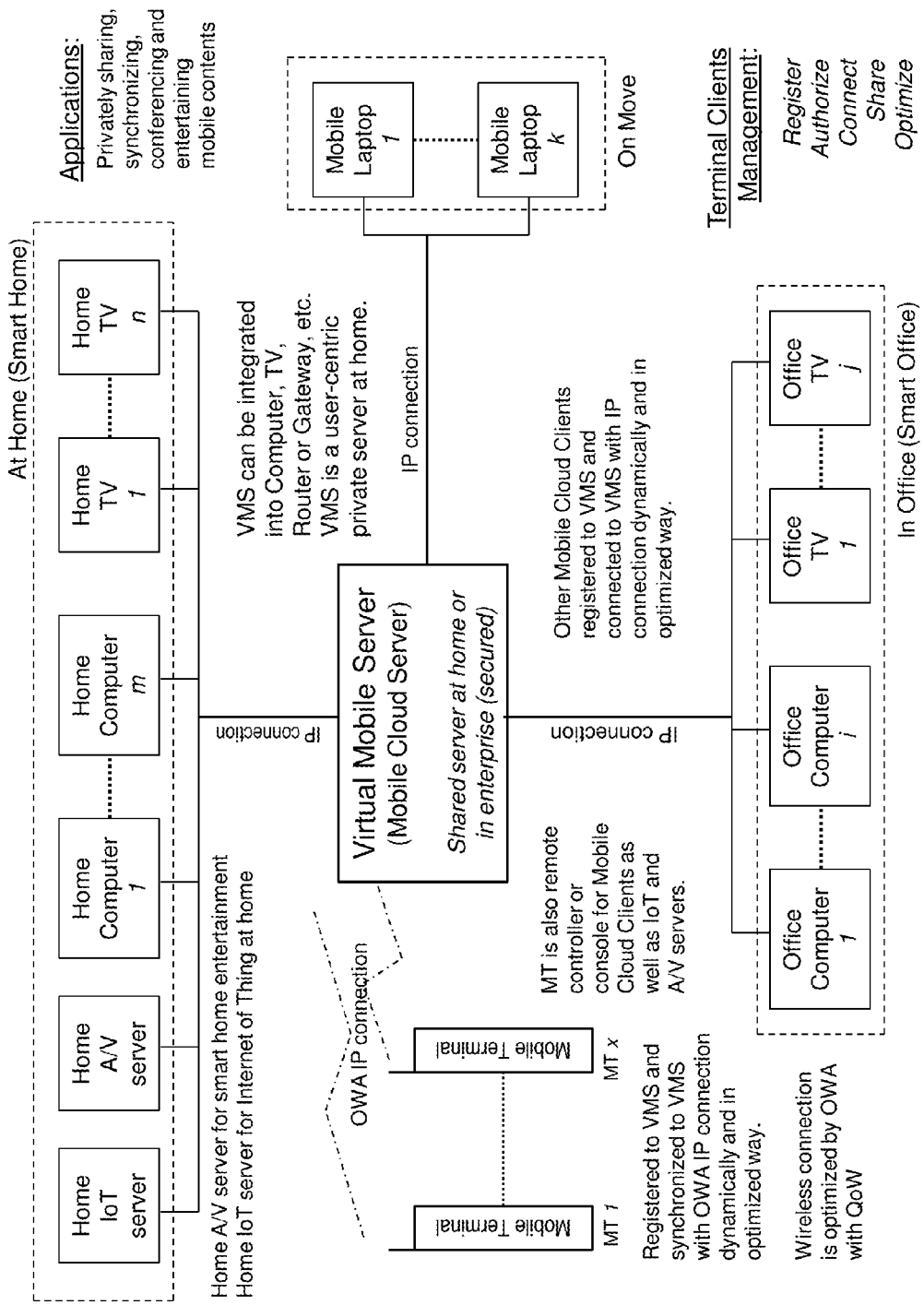
FIG.8 Integrated Smart Home and Smart Office platform by OWA Mobile Cloud

OPEN WIRELESS ARCHITECTURE (OWA) MOBILE CLOUD INFRASTRUCTURE AND METHOD

CROSS REFERENCE TO RELATED APPLICATION

This application is a continuation-in-part of the U.S. patent application Ser. No. 13/563,286, now U.S. Pat. No. 9,084,281, filed Jul. 31, 2012, entitled "OPEN WIRELESS ARCHITECTURE (OWA) MOBILE CLOUD INFRASTRUCTURE AND METHOD", which is hereby incorporated by reference herein.

BACKGROUND OF THE INVENTION

1. Field of the Invention

This invention relates to developing the next generation mobile wireless communications in simplifying the mobile terminal system that converges multiple wireless transmission standards by constructing the mobile cloud server-client architecture based on the open wireless architecture (OWA) technology platform. The invention discloses cost-effective and spectrum-efficient mobile cloud solutions by introducing the Virtual Mobile Server and Virtual Register and Call Switch (VR/CS) systems and methods associated with the OWA mobile terminal(s). The invention extends to other mobile cloud clients to provide smart lifestyle automation for smart home and smart office integration, convergence and intelligence.

2. Description of the Related Art

Wireless communications comprise a wide range of technologies, services and applications that have come into existence to meet the particular needs of different market sectors and user environments. Different systems can be broadly characterized by:

content and services offered
frequency bands of operation
standards defining the systems
data rates supported
bidirectional and unidirectional delivery mechanisms
degree of mobility
regulatory requirements
cost The service requirements for telecommunications retain the following characteristics:

Speech and SMS (Short Message System):

This service type requires a peak bit rates up to 16 kbps. In the year 2010 onwards, there will still be the need for this very low data rate application for speech and simple message service. In addition, some applications in the field of sensor communication and/or low bit rate data telemetry would also be expected as ubiquitous communications. Most mobile e-commerce applications would also be categorized in this type.

Multimedia and Low Rate Data:

This service type at a data rate of less than 144 kbps should also be considered, taking into account the compatibility with 3G and 2G data communication applications.

Medium Multimedia:

This type supports a peak bit rate of up to 2 Mbps. This type would be required to sustain compatibility with 3G applications.

High Multimedia:

This type should be considered in order to accommodate high data rate applications, including multi-media video streaming services, which are provided with broadband service in fixed wired communication systems, or with broadband wireless access systems.

Super High Multimedia:

This type should also be considered in order to accommodate super high data rate multi-media applications, which are currently provided with Fibre-to-the-Home (FTTH) services for wired communication systems.

Currently, these services require different communication devices with different connection facilities that users need to frequently switch between various terminals at home, office and in other environments.

A service usage pattern may be categorized according to an area where users exploit similar services and expect similar quality of service:

Home
Office
Public area
Wide area

In many countries, wireline Internet access in Home, Office and Public Area becomes very popular and affordable. Meanwhile, WLAN (wireless local area network) access is evolving rapidly in these domains.

Mobile communications have evolved rapidly worldwide. But when we look back at the wireless mobile communication history, three major issues remain unsolved:

1. The mobile wireless terminal architecture is too closed.
2. The mobile wireless terminal system is too complicated.
3. The mobile wireless services are too carrier-centric, not user-centric.

The wireless transmission theory of our research tells us that no single wireless transmission technology can provide both broadband high-speed radio transmission and seamless, fast mobility capability in a mobile fast-fading propagation model environment unless we reduce the mobile network capacity tremendously referred to as Lu's Laws in the industry.

Our research shows that when the transmission bandwidth is enough, the information processing consumes much more resources and energies than the transmission processing.

In order to solve the above three problems in mobile communications, let us analyze the current situation first.

In many countries, wireline Internet access in homes, offices and public areas have become very popular and affordable. Meanwhile, WLAN (wireless local area network) access is evolving rapidly in these domains.

Second generation (2G) wireless mobile systems were mainly designed for applications such as voice. Third generation (3G) and especially, fourth generation (4G) mobile system will increasingly be designed as a combination of different access technologies to complement each other in an optimum way for different service requirements and radio environments in order to provide a common and flexible service platform for different services and applications.

Access to a service or an application may be performed using one system or using multiple systems simultaneously or alternatively. Specifically, as will be described within the context of the present invention and has not been addressed in the art, such improved technology could include an integrated and converged communication system, which will combine the wireless mobile communication, wireline communication, wireless local area network, broadband wireless access system and Internet into one common platform so that the single Mobile Terminal can operate as a home phone, office phone, mobile phone and open terminal with a single user number that is the unique identifier of this integrated mobile communication terminal.

In the future, operators may deploy a mix of technologies that could, at various stages in time and subject to market and regulatory considerations, incorporate cellular, WLAN (wireless local area network), WMAN (wireless metropolitan area networks) or called BWA (broadband wireless access), WPAN (wireless personal access network), digital broadcast, satellite and other access systems as discussed by the present invention. This will require the seamless interaction of these systems in order for the user to be able to receive a variety of content via a variety of delivery mechanisms depending upon the particular terminal capabilities, location and user profile.

Different radio access systems will be connected via the open and flexible core networks. In this way, an individual user can be connected via a variety of different access systems to the networks and services he desires. The integration and convergence between these different access systems in terms of horizontal and vertical handover and seamless service provision with service negotiation including mobility, security and service quality management will be key requirements.

Due to the different application areas, cell ranges and radio environments, the different access systems can be organized in a layered structure similar to hierarchical cell structures in cellular mobile radio systems. The different layers correspond to the:

Distribution layer: This layer comprises digital broadcast type systems to distribute the same information to many users simultaneously through unidirectional links.

Cellular layer: The cellular layer may comprise several cell layers with different cell sizes and/or different access technologies.

Hot spot layer: This layer may be used for very high data rate applications, very high traffic density and individual links (e.g. in very dense urban areas, campus areas, conference centers or airports).

Personal network layer: Personal area networks will support short range high-speed direct communication between devices around the users.

Fixed (Wired) layer: This layer includes any fixed wireline access system.

Such an integrated mobile terminal system as provided by the present invention could intelligently converge mobile communications, Internet, wireline communications, wireless LAN, wireless MAN, wireless PAN, etc into an open system platform. Each of these represents a variety of applications, services and delivery mechanisms. These differing information flows are desired by the users to be available regardless of the means and manner of delivery. Most importantly, this mobile terminal becomes the All-in-One common personal communicator at home, the office, or on-the-move with a unified single telephone number.

It is well predicted that 2G (second generation), 3G (third generation in its present state), 4G (fourth generation), future mobile access and nomadic/local area wireless access elements are considered to be a system as a whole in the future. This converged and integrated communication platform as disclosed by the present invention, rather than separate and single mode of standard, will definitely drive the future telecommunication industry, but with a new business model for service providers and operators.

Continuous evolution is foreseen in future mobile terminals, with the use of new components, architectures, hardware, software platforms and improved user interfaces providing increased performance. The key technologies that will enable the future advanced mobile terminals as described in the present invention include:

Open Wireless Architecture (OWA) supporting multiple standards efficiently

Mobile Cloud technology to simplify the mobile terminal architecture

Migrating the service from the carrier-centric to the user-centric platform

Smart antennas and new space/time coding and decoding techniques

High efficiency power amplifiers and filters

Improved RF (radio frequency) modules, allowing higher operating frequencies and improved receiver sensitivity Advances in signal processing, increased processing efficiency Improved battery technology with increased energy density High-performance and low-power signal processing and processor platforms based on OWA Integration and convergence with wired terminals A unified global standard of mobile communications is becoming extremely difficult and almost impossible. An Open Wireless Architecture (OWA) based converged wireless platform will thus become reasonable and feasible in both business and technology, and therefore ITU (international telecommunication union) IMT-Advanced standardization has been targeting this direction in the long run.

Open Wireless Architecture (OWA) technology is one optimal solution for the Fourth Generation wireless and mobile communications (4G) and beyond on the worldwide basis. OWA refers to the open broadband wireless platform that can support diverse wireless and mobile standards, and can converge multiple wireless networks. To achieve this flexibility, OWA focuses on all aspects of a communication system including RF (radio frequency), baseband processing, networking and application segments. The flexibility and adaptability required for the converged open wireless platform can be achieved by defining the open interface parameters for the OWA systems and networks.

OWA helps in realizing global roaming facilities and seamless networking capabilities amongst different radio transmission technologies. It allows network operators and subscribers to use third party solutions or user-defined solutions on their systems and to customize their systems according to their business models. Using OWA, we can build systems which support multiple standards, multiple bands, multiple modes and offer diverse services to the customers.

OWA is different from SDR (software defined radio) as OWA basically maps various wireless standards into open interface parameters and maintains the system platform including RF, baseband, networks and applications as an open architecture. Hence, in OWA systems, different modules (both hardware and software) can be from different vendors. It is similar to the open computer architecture in the personal computer system and the open network architecture in the packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios into one broadband transceiver. In other words, SDR consumes much more power and spectrum in exchange for system flexibility. From the business point of view, SDR is not a cost-effective solution in wireless communications.

Furthermore, SDR uses a broadband transceiver to support multiple wireless standards which is very expensive in the commercial environment. However, OWA converges multiple air interfaces in an open system platform to maximize the transmission bandwidth and system performance, but each wireless transmission still uses the narrowband transceiver, therefore maintaining the system in a cost-effective way that is very important for commercial business.

By using OWA technology, we can converge multiple wireless standards into one open system to support both broadband high-speed radio transmission and seamless fast mobility capability in a mobile fast-fading propagation model environment while maintaining the very high mobile network capacity for commercial mobile business.

In addition, OWA allows allocating multiple air interfaces into an external card so that the users can simply change wireless standards by updating such air interface card without having to change the mobile terminal device or terminal system.

Now, how to simplify the mobile terminal system?

Our mobile research results tell us that when the transmission bandwidth is sufficient, the information processing consumes much more resource and energy than the transmission processing in the mobile terminal system. If we can reduce the processing burdens in the mobile terminal including baseband signal processing, application processing and networking processing, the overall system resources and power usage can be tremendously minimized and the system can be simplified.

The aforementioned OWA technology platform has secured enough transmission bandwidth by converging multiple wireless standards in one common platform so that the mobile terminal can be optimized for best-of-effort high-speed transmission.

By employing a computer server or network server with a home IP address as the Virtual Mobile Server, we can configure this server as the mobile cloud server to handle the processing tasks for the mobile terminal system, which becomes the mobile cloud client accordingly.

When the IP (Internet Protocol) connection is available for the mobile terminal based on OWA network access solution, the aforementioned mobile terminal moves its resource-consuming processing tasks to the remote virtual mobile server through IP connection, so that most of the processing tasks in the mobile terminal are done in the virtual mobile server instead.

Based on the above mobile cloud architecture, the mobile terminal system becomes very simple with basic functions of Transceiver, User Interface and Information Display only.

The OWA mobile cloud infrastructure of the present invention is a revolutionary approach in developing the next generation mobile wireless communications based on the OWA technology platform, which basically discloses the following several major inventions for the future mobile terminal system:

1. OWA provides multiple wireless transmissions solution without relying on the broadband transceiver.

2. OWA provides broadband high-speed transmission while securing seamless mobility capability.

3. OWA provides cost-effective and spectrum-efficient mobile cloud solutions by introducing the Virtual Mobile Server and the independent Virtual Register and Call Switch (VR/CS) systems.

4. OWA shifts the traditional carrier-centric service architecture to the future user-centric service delivery infrastructure.

5. The OWA mobile terminal can be extended to other mobile cloud clients including computer terminal client, television (TV) terminal clients and other terminal clients.

In the future, all mobile cloud clients including mobile terminal, computer terminal and TV terminal, etc will be synchronized to the virtual mobile server (mobile cloud server) to construct the synchronized Mobile Cloud infrastructure through IP (Internet Protocol) connections for user-centric home, office and enterprise networking convergence and service convergence.

SUMMARY OF THE INVENTION

This invention is directed to a simplified mobile terminal system based on OWA (open wireless architecture) mobile cloud architecture to support the convergence and integration of various wireless standards including existing and future mobile cellular standards, wireless local area network standards, wireless personal area network standards, broadband wireless access standards and wireline standards. The mobile cloud architecture comprises the virtual mobile server as the mobile cloud server and the mobile terminal as the mobile cloud client.

The OWA mobile cloud infrastructure, as set forth above, tremendously reduces the processing tasks in the mobile terminal system by moving many processing tasks remotely to the virtual mobile server through IP connection based on OWA network access control.

The invention of this OWA mobile cloud infrastructure includes the following parts:

First, the OWA mobile cloud infrastructure of the present invention comprises the capability that the mobile terminal can access plurality of and many of wireless air interfaces (or called radio transmission technologies—RTTs) based on the OWA converged wireless network access architecture. Such RTTs include Wireless LAN (WLAN) technology, Wireless PAN (WPAN) technology, Wireless MAN technology (or called BWA technology) and Cellular Mobile network technology, but not limited thereto.

Based on WEI LU's discovery (known as Lu's LAW) that "No single Radio Transmission Technology (RTT) can provide both Broadband High-speed Transmission and Seamless Mobility in a commercial environment", the future mobile wireless communications will be converging multiple RTTs in an open wireless architecture (OWA) platform. The future mobile terminal is therefore to integrate and converge multiple RTTs in the order of WLAN, WPAN, BWA and cellular mobile network for the cost-effective and spectrum-efficient purpose.

On the horizontal dimension of same RTT, multiple wireless networks of same RTT may be available for the mobile terminal, and so, selection criteria are required to access such multiple wireless networks. For WLAN, WPAN and BWA, Best-of-Efforts (BoE) based on signal strength, network performance and transmission bandwidth are normally considered to select the right network and optimize the network access, but not limited thereto, because such wireless access is mostly complimentary or with low fee.

Traditionally, the criterion to select cellular mobile networks (carriers) was based on rates, but it will have tremendous change in the future. The future mobile wireless communications will be converging multiple wireless technologies and converging multiple service delivery platforms in supporting truly service-oriented mobile communications rather than the traditional transmission-specific mobile networks. Therefore, the mobile users will care much more about the Best-of-Efforts (BoE), Simplicity of Use, Network Convergence, Inter-Networking QoS (quality of service) and Customer Service, etc instead of rates. As many experts had expected that, in the future, the wireless access cost will be free or of low cost for most of mobile wireless networks, and the new business model will be shifting from the traditional carrier centric to the user-centric service delivery architecture. In such case, the traditional carrier rate will not make any sense for the future mobile users.

Another trend for future mobile users is to make the mobile terminal as simple as possible, mostly on low power consumption, simple system and transmission architecture, as well as convenient personal communication experience, etc. In order to construct such a simple system and transmission terminal, a new Mobile Cloud architecture has been disclosed to move the processing tasks (applications, signals and networks) from the mobile terminal to the mobile cloud server called Virtual Mobile Server whenever the IP connection is established and synchronized between the mobile terminal and the virtual mobile server. Such virtual mobile server can support plurality of and many of mobile terminals in a centralized server center, data center or any network center with IP connection, but not limited thereto.

Such user-centric mobile cloud architecture (instead of the traditional carrier-centric) introduces the aforementioned Virtual Mobile Server and the Virtual Register and Call Switch (VR/CS), wherein both of them synchronize each other through IP connection or any PDM (Packet Division Multiplexed) connection. The aforementioned VR/CS manages, selects and switches the optimal cellular mobile networks for the mobile terminal of the mobile user based on the selection criteria as set forth above. By introducing the aforementioned VR/CS, we do not need to change anything in the existing mobile or wireless network infrastructures, including any cellular mobile networks and other wireless networks.

The VR/CS and Virtual Mobile Server, as set forth above, synchronize each other through wireline IP or PDM connection, or these two systems can integrate into the same system or same center subject to different network infrastructure or different service environment. Further, both of them can support many mobile terminals and many mobile users, wherein many mobile users and many mobile terminals can share the same VR/CS and Virtual Mobile Server, as set forth above.

The aforementioned mobile terminal synchronizes with the aforementioned Virtual Mobile Server, further synchronizing with the aforementioned VR/CS whenever an IP connection is available for the aforementioned mobile terminal. Such IP connection includes IP over wireline network, IP over WLAN, IP over WPAN, IP over BWA and IP over Cellular mobile network, but not limited thereto.

The aforementioned VR/CS also manages the user-centric mobile user registrations comprising the mobile user identifier (ID) unifying and integrating mobile user personal communication identifier (ID), mobile user personal identifier (ID), mobile telephone number, mobile user domain address, mobile security identifier (or called Mobile DNA), or any identifier (ID) which the mobile user prefers, but not limited thereto. Based on the aforementioned and further below-mentioned mobile cloud infrastructure, the future wireless and wireline networks will be totally converged and integrated into an open architecture service delivery platform wherein ONE device and ONE number supporting multiple networks will become reality. Such user-centric communication registration (rather than the traditional carrier-centric closed telephone number registration) will enable truly user-preferable and truly service-oriented PERSONAL Communication architecture for the open convergence of multiple networks, both wireline and wireless networks. The aforementioned various mobile user registration identifiers are generally referred to the user-centric "Mobile User ID" by default in the present invention, but not limited thereto.

The aforementioned user-centric Mobile User ID managed in the aforementioned VR/CS is a very user-friendly communication ID, independent to the specific wireless or wireline networks, wherein the specific transmission address in the specific networks may be mapped, encoded or calculated from the aforementioned Mobile User ID, but fully separated and independent from the mobile users. Therefore, the mobile users do not have to change the aforementioned Mobile User ID across various different networks including both wireline and wireless networks, in the future service-oriented network convergence infrastructure.

The aforementioned VR/CS can be implemented by general network equipment, such as gateway, switch, router, server, but no limited thereto, as long as IP or PDM connection is established. Such IP or PDM can be over any wireline mediums including ATM (asynchronous transfer mode), Frame Relay and Fiber Optical, but not limited thereto.

The aforementioned VR/CS manages the switching of various calls including voice, data, video and messages, but not limited thereto. For the aforementioned network selection to the multiple cellular mobile networks (carriers), the aforementioned VR/CS negotiates with such multiple cellular mobile networks based on the criteria as set forth above.

The aforementioned mobile terminal by Open Wireless Architecture (OWA) may connect to the networks (wireline networks or wireless networks) either through IP/PDM connection (IP over wireline network, IP over WLAN, IP over WPAN, IP over BWA or IP over Cellular mobile network) or through Non-IP cellular mobile network.

Second, the OWA mobile cloud infrastructure of the present invention incorporates an OWA mobile terminal integrating the WLAN technology, WPAN technology, Wireless MAN technology (or called BWA technology) and Wireline Internet Access technology with the common air interfaces mobile cellular communication standards (for example, cdma2000, WCDMA, GSM, GPRS, TD-SCDMA, OFDM, WiMax, etc, but not limited thereto) through the Open Wireless Architecture (OWA) platform of the present invention. OWA defines the open interface for each subsystem and function unit so that the system is open for upgrade and reconfiguration. The method of present invention supports any short range wireless access technologies including Wireless LAN, Wireless MAN and Wireless PAN, but not limited thereto. Also, as utilized hereinafter the term "common air interface mobile standards" refers to any type of mobile cellular technology operable in the fashion of "TDMA (time division multiplex access) or CDMA (code division multiplex access) or OFDM (orthogonal frequency division multiplex)", but not limited thereto.

It is well known to the ordinary skills in the art by the time of this invention that, the wireline communication is normally based on IP (internet protocol) connection, no matter that the physical wireline transmission is based on ATM (asynchronous transfer mode), Frame-Relay, Fiber Optical or other mediums. In such case, the wireline connection is based on "IP over such broadband high-speed wireline mediums". Because the wireline link is of very high-speed broadband transmission (up to hundreds of Gb/s to Tb/s), we assume the wireline transmission bandwidth is up to unlimited. Hence, we can simply call the wireline connection as IP connection.

However, for wireless transmission limited by the available radio spectrum, the wireless transmission bandwidth is far from "unlimited", and therefore it is required to specify the underlying physical transmission medium in order to support the IP connection. In general, wireless radio transmission is based on circuit-switched (instead of packet-switched) transmission mode, especially for the cellular mobile communications with fast-fading propagation model. Therefore, for general radio transmission technologies (RTTs) and by default, the wireless link is non-IP connection. For example, the cellular CDMA and TDMA mobile communications with fast-fading seamless mobile radio propagation model, the wireless transmission link is a non-IP connection. However, for some non-seamless mobile and short range wireless access networks, because the radio propagation model is slow-fading and the radio transmission environment is very stable, the packet-division (or packet switched) connection becomes possible over the slow-fading and stable circuit-switched transmission medium of the underlying physical layer. Such slow-fading and stable RTTs include the non-mobile WLAN, WPAN, BWA and the slow-mobile BWA and Cellular mobile networks. In order to support the mobile Internet services, by default, the WLAN, WPAN and BWA can support IP connection. For cellular mobile networks, IP connection is possible if the radio propagation model is slow-fading, mobile speed is low and/or the transmission environment is stable, otherwise, the cellular radio link remains the circuit-switched non-IP connection. So, for wireless communications by default, we have IP over WLAN, IP over WPAN, IP over BWA and IP over Cellular Mobile network as well as non-IP over Cellular Mobile network, but not limited thereto.

Third, the OWA mobile terminal of the present invention supports multiple standards of both wireless and wireline communications wherein Software Defined Module (SDM) is used to install or update the different communication standards module. This SDM can be stored in an External Card, for example, flash memory card, SIM (smart integrated memory) card, or downloadable from the Internet. The External Card of the SDM may also contain independent processor, DSP (Digital Signal Processor) or other components in addition to memory unit to facilitate additional system processing.

Fourth, the OWA mobile terminal of the present invention incorporates automatic network access capabilities, wherein the mobile terminal system searches the available network access in the order of wired network, Wireless LAN, Wireless PAN, BWA (broadband wireless access), mobile cellular network for example, but not limited thereto. The search order can be updated or managed by the user. When the wired network is detected, this mobile terminal becomes the wireline terminal and the communication is established by IP connection including IP data, IP video and VoIP for voice, etc. If wired network is not available, and Wireless LAN is detected, this mobile terminal becomes the Wireless LAN terminal and the communication is established by IP connection too. Wireless LAN access is regarded as the wireless extension of the wireline network access in the local short range domain. If both wired network and Wireless LAN are not available, the mobile terminal system of the present invention will search other short range wireless access networks including Wireless PAN, etc, or search broadband Wireless Metropolitan Area Networks (Wireless MAN) or called Broadband Wireless Access (BWA) for wireless IP connection. In the event that all these networks are not detected, the mobile terminal will switch back to the cellular mobile mode wherein cellular mobile air interface standards (for example, GSM/GPRS, cdma2000, WCDMA, TD-SCDMA, etc, but not limited to) will be employed based on the mobile preference list set by the user.

The cellular mobile networks include IP connection for slow-mobile, slow-fading and/or stable radio transmission environment, and non-IP traditional circuit-switched connection if the mobile speed is too fast or the propagation model is of fast-fading.

The mobile cellular air-interface modules supported in the mobile terminal of the present invention can be stored in the terminal itself, or in the External Card or its software and parameters downloaded from the Internet in the form of the aforementioned SDM. The mobile terminal associated with the OWA mobile cloud of the present invention is therefore capable of being operative in an open wireless and wireline communication environment supporting various standards and interfaces.

Fifth, the OWA mobile terminal of present invention incorporates a new incoming Call Processing Management capability in the Virtual Register and Call Switch (VR/CS), wherein the incoming mobile calls (including Voice, data, Video and Message calls) associated with the called mobile phone number or called mobile user identifier (mobile user ID) are queued for further connecting to the destination mobile terminal based on the Connection Table containing the current network access status of the destination mobile terminal as set forth above. If this destination mobile terminal connects to the wired Internet network (first priority for example) or Wireless LAN or Wireless PAN or Wireless MAN (or called BWA), the aforementioned incoming call is forwarded to the destination mobile terminal directly through IP connection by IP-calling from the VR/CS to the destination mobile terminal as set forth above, wherein the Visitor IP address reported by the destination mobile terminal is dialed. If the destination mobile terminal, as set forth above, does not connect to either the wired network or the wireless LAN or the wireless PAN or the wireless MAN, but connects to the cellular mobile network (for example, TDMA or CDMA or mobile OFDM), the aforementioned incoming call is forwarded to the associated Base Station wherein the communication with the destination mobile terminal is over the wireless cellular air link (through allocated mobile cellular transmission channel) of available mobile cellular standards. Based on the radio propagation model (fast-fading or slow-fading), terminal mobile speed (fast seamless mobile or slow mobile) and radio transmission environment (stable or unstable), the aforementioned cellular mobile communication link can be either IP connection or non-IP connection.

Based on different underlying physical transmission mediums, the IP connection of the aforementioned mobile terminal can be IP over wireline, IP over WLAN, IP over WPAN, IP over BWA or IP over Cellular Mobile, but not limited thereto.

In case the destination mobile terminal, as set forth above, is not able to access any above available networks, the VR/CS then forwards the aforementioned incoming call to a main computer server, in main server center or data center, which is configured as a Virtual Mobile Server called Mobile Cloud Server through IP connection, as will be described within the context of the present invention.

To simplify the system implementation and maximize the system performance of the aforementioned mobile terminal, in case the incoming call is a rich-application call (consuming much transmission bandwidth and processing resources) such as video call or large file call, etc, but the stable and high-speed IP connection is not available, the aforementioned mobile terminal may request the aforementioned VR/CS to reroute the aforementioned incoming call to the aforementioned virtual mobile server without connecting this incoming call to the aforementioned mobile terminal to save both wireless system and wireless transmission resources.

The aforementioned IP connection applied to all of the Packet Division Multiplex (PDM) networks in supporting packet-switched transmissions. By default in the present invention, PDM refers to IP or other packet-switched connections.

When multiple cellular networks are available for the aforementioned mobile terminal to select the optimal cellular mobile link(s), either in IP connection or in non-IP connection, the selection method of cellular networks is based on the overall rating of Best-of-Effort, Simplicity and Convergence, Inter-networking QoS (quality of service), Network Performance, Cost Effectiveness and Customer Services for each mobile user, but not limited thereto. Such network selection table is maintained in the Network Access Optimizer of the aforementioned VR/CS, synchronized with the virtual mobile server, as set forth above.

Whenever an IP connection is available, the aforementioned mobile terminal synchronizes with the virtual mobile server in a real-time and optimized manner.

The synchronized IP or PDM link between the mobile terminal and the virtual mobile server, as set forth above, include IP over WLAN, IP over WPAN, IP over BWA and IP over Cellular Mobile network, but not limited thereto.

The aforementioned WLAN may include WiFi network, wireless local loop, IEEE802.11 network and HyperLAN, but not limited thereto. The aforementioned WPAN may include Bluetooth network, ZigBee network, UWB (ultra wideband wireless) network and IEEE802.15 network, but not limited thereto. The aforementioned BWA may include WiMax network, spectrum-spreading wireless network, wireless ATM (asynchronous transfer mode) network and IEEE802.16 network, but not limited thereto. The aforementioned cellular mobile network may include CDMA, TDMA and OFDM, as set forth above, but not limited thereto.

Sixth, the OWA mobile cloud of the present invention comprises the utilization of the computer server(s) with Internet access as the Virtual Mobile Server (also called Mobile Cloud Server) in Data Center or in any server locations, as set forth above, supporting the aforementioned mobile terminal of the present invention with enhanced functions and services, for example, network optimization, mobile secretary, mobile applications, mobile Internet optimization server, mobile Internet applications server, Voice and Video server, Short Message Service (SMS) server, Multimedia Message Service (MMS) server, aforementioned SDM center and Date Center, etc. This Virtual Mobile Server, as set forth above, also takes the function of Special Service Management for the aforementioned mobile terminal on mobile location, emergency call, information collection, security and safety control, sensor network control and OWA mobile cloud O&M (Operation and Maintenance), etc. Additionally, one Virtual Mobile Server, as set forth above, can support one or multiple mobile terminals of the present invention, wherein many such mobile terminals can share the same aforementioned Virtual Mobile Server.

The aforementioned Virtual Mobile Server(s) supporting group or many of aforementioned mobile terminals can locate in the computer servers' center or in the network data center.

For the OWA mobile cloud infrastructure of the present invention, the aforementioned virtual mobile server comprises an important Mobile Terminal Processing Unit which operates the OWA Interface processing, base-band signal processing, application processing and networking processing for the mobile terminal, as set forth above.

The aforementioned Mobile Terminal Processing Unit further comprises the following functions with the aforementioned mobile terminal: bandwidth optimization and synchronization, signals synchronization, applications synchronization as well as network optimization and synchronization.

The aforementioned virtual mobile server also includes a Mobile Internet Applications server for the aforementioned mobile terminal when the IP connection between them is available.

The aforementioned virtual mobile server is a very important system for the OWA mobile cloud infrastructure which is utilized for mobile cloud server processing for the mobile terminal(s), hosting various mobile applications and maintaining the aforementioned SDM air interfaces modules for one or multiple mobile terminals, as set forth above.

The aforementioned virtual mobile server can be located in the network Data center supporting groups of the aforementioned mobile terminals.

Whenever an IP connection is available, the aforementioned mobile terminal synchronizes with the virtual mobile server in a real-time and optimized manner.

The synchronized IP or PDM link between the mobile terminal and the virtual mobile server, as set forth above, include IP over WLAN, IP over WPAN, IP over BWA and IP over Cellular Mobile network, but not limited thereto.

Seventh, the OWA mobile cloud infrastructure of the present invention defines a new OWA Interface to maximize the information transmission efficiency between the aforementioned mobile terminal and the aforementioned virtual mobile server. This OWA interface optimizes the wireless transmission for IP (internet protocol) over multiple radio transmission technologies (RTTs) including IP over WLAN, IP over WPAN, IP over BWA or IP over Cellular Mobile, but not limited thereto.

Eighth, the OWA mobile terminal of the present invention supports open interface between the main functional units of the mobile terminal and the RF/IF (radio frequency/intermediate frequency) subsystem so that the mobile terminal RF/IF part is portable and reconfigurable. In other words, mobile users can change or replace the RF/IF ports subject to multiple different RTTs without having to change the aforementioned mobile terminal device. This method of the present invention is necessary when the different wireless standards run in different frequency bands which are not within the same RF/IF transceiver limit. This open and portable RF/IF architecture of the present invention is also very important to support new wireless transceiver technologies including smart antennas, MIMO (Multiple Input, Multiple Output), High efficiency power amplifiers, Improved RF modules allowing multiple operating frequencies and improved receiver sensitivity, etc.

Ninth, the system and method of present invention introduces a new innovative solution to converge and integrate the various communication devices into one open platform, wherein the conventional home phone, office phone and cellular phone, etc are combined together into an integrated and converged terminal, as set forth above, with one single communication number. Furthermore, the aforementioned common terminal of the present invention utilizes the existing or any future communication standards (including both wireless and wireline standards by changing or replacing the aforementioned SDM card) rather than relying on new defined transmission technologies. Specifically, as described within the context of the present invention, the aforementioned common terminal is just an improvement of the existing communication device, wherein this common terminal, as set forth above, is operable in each individual communication standard and backwards compatible to the same individual transmission technology.

Lastly, the system and method of present invention comprises the best and optimal utilization of the existing communication infrastructure, wherein almost all existing telecommunication equipments, including Mobile Switching Center, Base Station, Gateway and Router, and backbone networks, but not limited thereto, remain unchanged and fully operable.

The advantage of the OWA Mobile Cloud system and method of the present invention includes remarkable improvement of spectrum efficiency in mobile cellular bands, improvement in network resource and radio transmission resource, optimization in network interoperability, enhancement of the emerging broadband availability, convergence of entertainment and Voice/Data services, interaction and integration of various communication devices and defining the future intelligence of truly smart and service-oriented communication environment. More specifically, the system of the present invention provides the capability of the true Personal Communications, wherein one single mobile terminal with one single mobile number or mobile identifier manages all personal communications needs everywhere and anytime.

As a conclusion, the OWA mobile cloud infrastructure of the present invention is a revolutionary approach in developing the next generation mobile wireless communications based on the OWA technology platform which basically discloses the following several major inventions for the future mobile terminal system:

1. OWA provides multiple wireless transmissions solution without relying on the expensive broadband transceiver.

2. OWA provides broadband high-speed transmission while securing seamless mobility capability.

3. OWA provides cost-effective and spectrum-efficient mobile cloud solutions by introducing the Virtual Mobile Server platform.

4. OWA enables the mobile terminals and the virtual mobile server fully synchronized when the IP connection is available, thus greatly simplifying the mobile terminal system in terms of power consumption and system performance.

5. OWA discloses the converged and Best-of-Effort OWA IP connection for the mobile terminal comprising IP over wireline network, IP over WLAN, IP over WPAN, IP over BWA and IP over Cellular Mobile networks.

Further in conclusion, an Open Wireless Architecture (OWA) Mobile Cloud Infrastructure of the present invention discloses the following systems:

a) Virtual Register and Call Switch (VR/CS) managing, selecting, connecting and switching the multiple cellular mobile networks for a Mobile Terminal of a mobile user based on preset network selection criteria, and also managing mobile users' registrations based on user-centric instead of carrier-centric registration model.

b) Virtual Mobile Server (VMS) as Mobile Cloud Server managing mobile users, mobile users' network access, mobile applications and mobile data center, and synchronizing with the aforementioned VR/CS through wireline IP (Internet Protocol) or PDM (Packet Division Multiplexed) connection.

c) Mobile Terminal as Mobile Cloud Client connecting to and synchronizing with the aforementioned VMS and VR/CS through the aforementioned IP over wireline or wireless connection, or connecting to the aforementioned VR/CS through Non-IP (internet protocol) cellular mobile connection.

d) By extending mobile terminal to other mobile cloud clients including computer terminal client, television (TV) terminal client and other terminal clients (such as monitor terminal and projector terminal, etc), applications and contents can be shared among different mobile cloud clients in either synchronized or non-synchronized way. Furthermore, mobile terminal can push any interested applications and contents anywhere (on road or on move) from mobile terminal to selected computer terminal or TV terminal at home or at office, and also pop interested applications and contents from selected computer terminal or TV terminal to the mobile terminal through virtual mobile server, as set forth above.

e) The aforementioned computer terminal client, TV terminal client, monitor terminal client and projector terminal clients are all connected to Internet with IP connections through wireline network or WLAN, as set forth above.

f) The aforementioned virtual mobile server may integrate into the aforementioned computer terminal or TV terminal systems, etc in home or office applications for cost-effective and performance-optimal purpose.

The synchronization among the aforementioned mobile cloud clients (mobile terminal, computer terminal, TV terminal, monitor terminal, projector terminal, etc) is seamless because each mobile cloud client is fully synchronized to the aforementioned virtual mobile server, and centrally controlled by the aforementioned virtual mobile server.

The aforementioned mobile terminal utilizes the aforementioned OWA IP connection, the aforementioned virtual mobile server utilizes the aforementioned wireline IP connection and the aforementioned computer terminal and TV terminal, etc, utilize the aforementioned wireline IP connection or WLAN IP connection.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which:

FIG. 5 is a transmission framework of mobile cloud OWA Interface for communicating between the mobile terminal and the virtual mobile server. The OWA Interface optimizes the wireless transmission with IP (internet protocol) over various RTTs (radio transmission technologies) such as IP over WLAN, IP over WPAN, IP over BWA and IP over Cellular, etc.

FIG. 6 discloses an OWA application optimizer in the mobile terminal to manage the mobile application processing either through the virtual mobile server or locally in the mobile terminal.

FIG. 8 discloses an integrated smart home and smart office platform by OWA mobile cloud architecture.

Like reference numerals refer to like parts throughout the several views of the drawings.

DESCRIPTION OF THE PREFERRED EMBODIMENT

Figure 1:
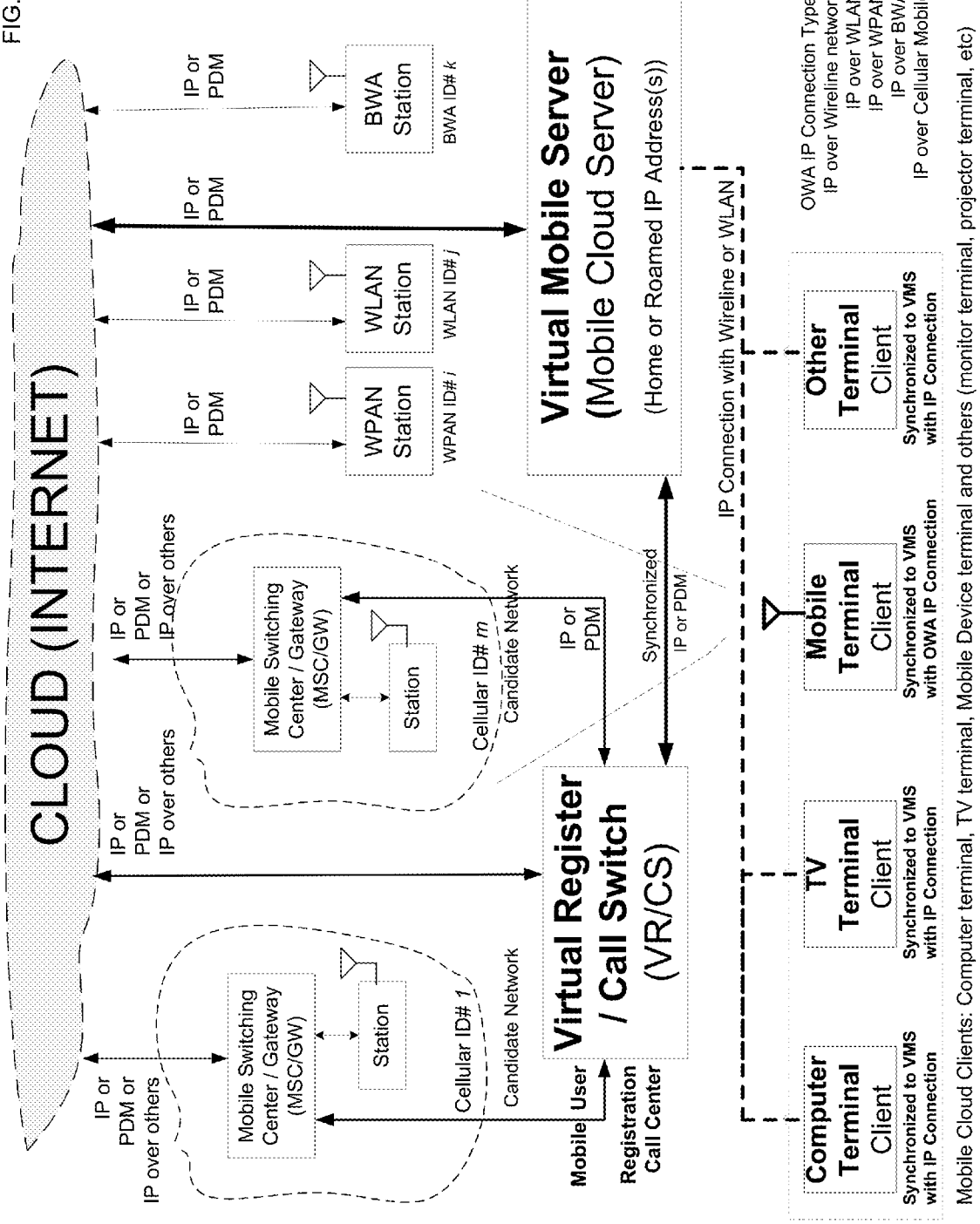
FIG. 1 is a Mobile Cloud infrastructure supporting OWA mobile terminal wherein Virtual Mobile Server and Virtual Register and Call Switch (VR/CS) are disclosed to optimize the system and transmission performance for the mobile terminal.

The present invention relates to a mobile cloud architecture based on OWA platform wherein the processing tasks of the mobile terminal including base-band signal processing, application processing and networking processing can be allocated to the virtual mobile server, which is a computer server with home IP address or assigned roaming IP address by the aforementioned home IP address when an IP connection is set up between the mobile terminal and the virtual mobile server. Such IP connection is established when the mobile terminal connects to a wireline network, a short range wireless access network (for example, Wireless LAN and Wireless PAN, but not limited thereto) or a broadband wireless metropolitan area network (Wireless MAN, for example, Broadband Wireless Access system, but not limited thereto). In this way, the mobile terminal's system complexity can be tremendously reduced, the processing power consumption can be greatly decreased and the system performance is maximized accordingly.

An OWA mobile cloud infrastructure of the present invention comprises the capability that the mobile terminal can access plurality of and many of wireless air interfaces (or called radio transmission technologies—RTTs) based on the OWA converged wireless network access architecture. Such RTTs include Wireless LAN (WLAN) technology, Wireless PAN (WPAN) technology, Wireless MAN technology (or called BWA technology) and Cellular Mobile network technology, but not limited thereto.

Based on WEI LU's discovery that "No single Radio Transmission Technology (RTT) can provide both broadband high-speed transmission and seamless mobility in a commercial environment", the future mobile wireless communications will be converging multiple RTTs in an open wireless architecture (OWA) platform. The future mobile terminal is therefore to integrate and converge multiple RTTs in the order of WLAN, WPAN, BWA and cellular mobile for the cost-effective and spectrum-efficient purpose.

On the horizontal dimension of same RTT, multiple wireless networks of same RTT may be available for the mobile terminal, and so, selection criteria are required to access such multiple wireless networks. For WLAN, WPAN and BWA, Best-of-Efforts (BoE) based on signal strength, network performance and transmission bandwidth are normally considered to select the right network and optimize the network access, but not limited thereto, because such wireless access is mostly complimentary or with low fee.

Traditionally the criteria to select cellular mobile networks (carriers) was based on rates, but it will have tremendous change in the future. The future mobile wireless communications will be converging multiple wireless technologies and converging multiple service delivery platforms in supporting truly service-oriented mobile communications rather than the traditional transmission-specific mobile networks. Therefore, the mobile users will care much more about the Best-of-Efforts (BoE), Simplicity of Use, Network Convergence, Inter-Networking QoS (quality of service) and Customer Service, etc instead of just rates. As many experts had expected that, in the future, the wireless access cost will be free or of low cost for most of mobile wireless networks, and the new business model will be shifting from the traditional carrier centric to the user-centric service delivery architecture. In such case, the traditional carrier rate will not make any sense for the future mobile users.

Another trend for future mobile users is to make the mobile terminal as simple as possible, mostly on low power consumption, simple system and transmission architecture, as well as convenient personal communication experience, etc. In order to construct such a simple system and transmission terminal, a new Mobile Cloud architecture has been disclosed to move the processing tasks (applications, signals and networks) from the mobile terminal to the mobile cloud server called Virtual Mobile Server whenever the IP connection is established and synchronized between the mobile terminal and the virtual mobile server. Such virtual mobile server can support plurality of and many of mobile terminals in a centralized server center, data center or any network center with IP connection, but not limited thereto.

Such user-centric mobile cloud architecture (instead of the traditional carrier-centric) for the OWA mobile terminal as shown in FIG. 1, introduces the aforementioned Virtual Mobile Server and a Virtual Register and Call Switch (VR/CS), wherein both of them synchronize each other through IP connection or any PDM (Packet Division Multiplexed) connection. The aforementioned VR/CS manages, selects and switches the optimal cellular mobile networks for the mobile terminal of the mobile user based on the selection criteria as set forth above. By introducing the aforementioned VR/CS, we do not need to change anything in the existing mobile or wireless network infrastructures, including any cellular mobile networks and other wireless networks.

The VR/CS and Virtual Mobile Server, as set forth above, synchronize each other through wireline IP or PDM connection, or these two systems can integrate into the same system or same center subject to different network infrastructure or different service environment. Further, both of them can support many mobile terminals and many mobile users wherein, many mobile users and many mobile terminals can share the same VR/CS and Virtual Mobile Server, as set forth above.

The aforementioned mobile terminal synchronizes with the aforementioned Virtual Mobile Server, further synchronizing with the aforementioned VR/CS whenever an IP connection is available for the aforementioned mobile terminal. Such IP connection includes IP over wireline network, IP over WLAN, IP over WPAN, IP over BWA and IP over Cellular mobile network, but not limited thereto.

The aforementioned VR/CS also manages the user-centric mobile user registrations comprising the mobile user identifier (ID) unifying and integrating mobile user personal communication identifier (ID), mobile user personal identifier (ID), mobile telephone number, mobile user domain address, mobile security identifier (or called Mobile DNA), or any identifier (ID) which the mobile user prefers, but not limited thereto. Based on the aforementioned and further below-mentioned mobile cloud infrastructure, the future wireless and wireline networks will be totally converged and integrated into an open architecture service delivery platform wherein ONE device, ONE number supporting multiple networks will become reality. Such user-centric communication registration (rather than the traditional carrier-centric closed telephone number registration) will enable truly user-preferable and truly service-oriented PERSONAL communication architecture for the open convergence of multiple networks, both wireline and wireless networks. The aforementioned various mobile user registration identifiers are generally referred to the user-centric "Mobile User ID" by default in the present invention, but not limited thereto.

The aforementioned user-centric Mobile User ID managed in the aforementioned VR/CS is a very user-friendly communication ID, independent to the specific wireless or wireline networks, wherein, the specific transmission address in the specific networks may be mapped, encoded or calculated from the aforementioned Mobile User ID, but fully separated and independent from the mobile users. Therefore, the mobile users do not have to change the aforementioned Mobile User ID across various different networks including both wireline and wireless networks, in the future service-oriented network convergence infrastructure.

The aforementioned VR/CS manages the switching of various calls including voice, data, video and messages, but not limited thereto. For the aforementioned network selection to the multiple cellular mobile networks (carriers), the aforementioned VR/CS negotiates with such multiple cellular mobile networks based on the criteria as set forth above.

The aforementioned multiple cellular mobile networks can converge or merge into a unified cellular mobile network to optimize the open mobile cloud infrastructure.

The aforementioned mobile terminal by Open Wireless Architecture (OWA) may connect to the networks (wireline networks or wireless networks) either through IP/PDM connection (IP over wireline network, IP over WLAN, IP over WPAN, IP over BWA or IP over Cellular mobile network) or through non-IP cellular mobile network.

The Virtual Mobile Server and the VR/CS, as set forth above, connect to the backbone Internet through IP or PDM connection, and the aforementioned mobile terminal becomes the mobile cloud client once connected and synchronized with the aforementioned virtual mobile server through IP or PDM connection. All wireless networks disclosed in FIG. 1 connect to the backbone Internet through IP or PDM connections.

The aforementioned mobile terminal can be any wireless or mobile terminal equipment including mobile device, smartphone, tablet, laptop for mobile Internet, Internet of Things (IoT), Cyber Physical Systems, Ubiquitous networks, Sensor networks, but not limited thereto. The aforementioned mobile terminal can be extended to computer terminal, television (TV) terminal and other terminals including monitor terminal or projector terminal, but not limited thereto.

The aforementioned computer terminal, TV terminal and other terminals are synchronized to the aforementioned Virtual Mobile Server with the aforementioned IP connections through the aforementioned wireline network or WLAN with synchronization priority order preset or reset by the users.

By synchronizing the mobile terminal, computer terminal, TV terminal and other terminals to virtual mobile server through IP connections, as set forth above, the aforementioned mobile terminal can push its applications and contents to or pop interested applications and contents from the computer terminal, TV terminal or other terminals, as set forth above, through the aforementioned virtual mobile server. The push-pop priority order list of the aforementioned computer terminal, TV terminal and other terminals is defined and updated by the user.

The aforementioned virtual mobile server can integrate into TV system or Desktop computer system for home application or office application in a cost-effective and performance-efficient way.

With optimized wireless connections for mobile terminal based on OWA transmission optimization, the aforementioned mobile terminal can push applications and contents to or pop applications and contents from other selected synchronous mobile cloud clients (computer terminal, TV terminal or other terminals) anywhere and anytime in different locations directly from the aforementioned virtual mobile server fully synchronized.

While the aforementioned pushed applications and contents from the aforementioned mobile terminal to the aforementioned other selected mobile cloud clients through the aforementioned virtual mobile server can be transparent without any limitation, the aforementioned popped applications and contents from the aforementioned other selected mobile cloud clients to the aforementioned mobile terminal through the aforementioned virtual mobile server must be optimized and processed in mobile applications unit of the aforementioned virtual mobile server to optimize the system performance, save the transmission bandwidth and minimize the power consumption in the aforementioned mobile terminal.

The aforementioned TV terminal relates to large screen display terminal displaying information contents either from television broadcasting channels or from Internet sources or from off-line content players such as media players or information storage players, but not limited thereto. The aforementioned computer terminal relates to desktop computer terminal, enterprise computer terminal, industrial computer terminal or portable computer terminal, but not limited thereto. The aforementioned mobile terminal relates to mobile device, handheld device, smartphone, tablet, mobile computing device, laptop, notebook, but not limited thereto.

The aforementioned mobile cloud clients including mobile terminal, computer terminal, TV terminal and other terminals, as set forth above, support full IP services including IP voice, IP data, IP video and IP multimedia, but not limited thereto.

The virtual mobile server, the computer terminal and the TV terminal, as set forth above, through wireline networks, can have extremely high-speed connections to the Internet and between each other.

The aforementioned mobile terminal can have optimized and best-of-effort high-speed connection to the Internet and further to the aforementioned virtual mobile server based on OWA transmission optimization for the aforementioned mobile terminal in the priority order of wireline network, WLAN, WPAN, BWA and cellular mobile, as set forth above, for the cost-effective and spectrum-efficient purpose.

The aforementioned OWA transmission optimization for the aforementioned mobile terminal is based on the criteria of transmission bandwidth, cost effectiveness and spectrum efficiency for the aforementioned mobile terminal, wherein the aforementioned criteria is defined as Quality of Wireless (QoW) connections for the aforementioned OWA transmission optimization.

The aforementioned QoW is based on combined consideration of cost, bandwidth and spectrum efficiency wherein an acceptable QoW means a good transmission bandwidth with good cost-effectiveness and spectrum-efficiency including acceptable QoW with the IP connection over the WLAN, and an unacceptable QoW means a poor transmission bandwidth or poor cost-effectiveness though transmission bandwidth could be good, or poor spectrum efficiency, including unacceptable QoW with the IP connection over the cellular mobile networks but costing too much for mobile user of the mobile terminal, wherein the cellular mobile networks include the TDMA, the CDMA, the OFDM and the PDMA (packet division multiplex access).

The aforementioned OWA transmission optimization with the aforementioned QoW control is performed in the aforementioned network optimization unit of the aforementioned virtual mobile server.

The aforementioned OWA IP connection refers to IP connection to Internet through IP over wireline network, IP over WLAN, IP over WPAN, IP over BWA or IP over cellular mobile, as set forth above, wherein the aforementioned IP can refer to standard IP, IP version 6 or any Packet Division Multiplexed (PDM) protocol.

Figure 2:
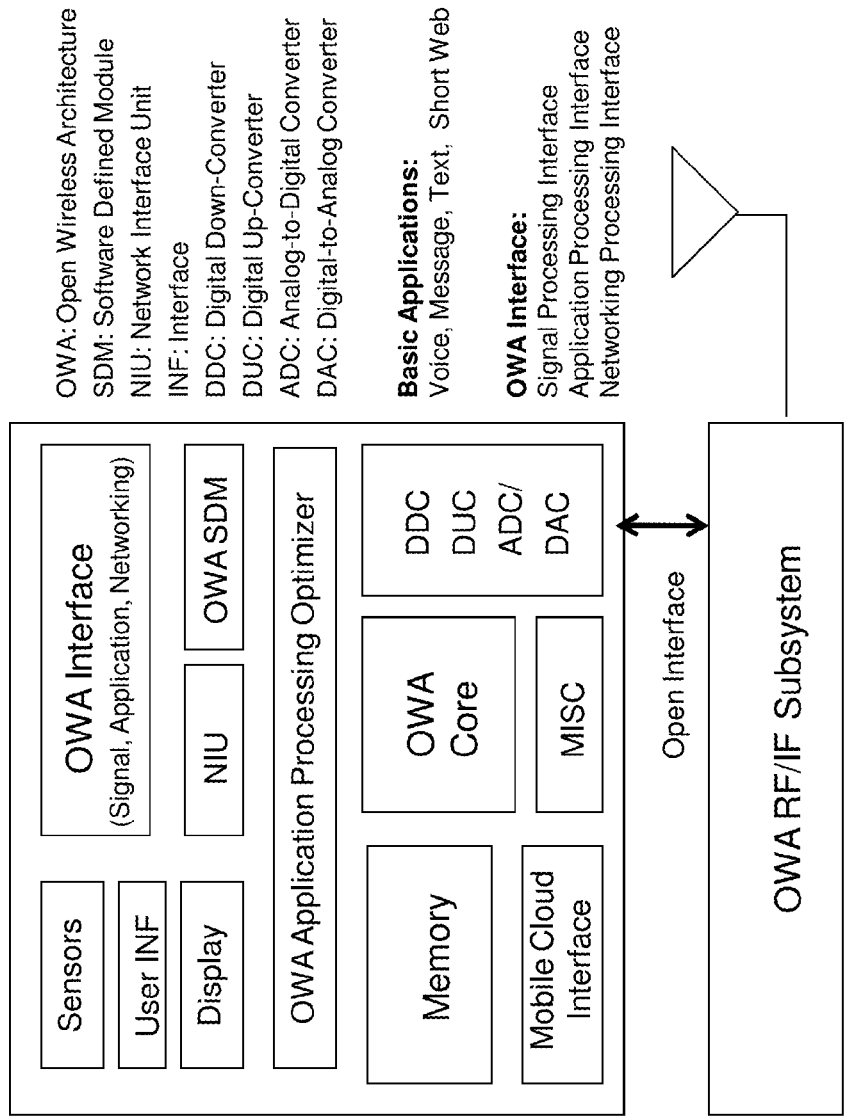
FIG. 2 is an Architecture of Mobile Cloud wireless mobile terminal, wherein main functional modules of this invention are disclosed.

FIG. 2 is an architecture of mobile cloud wireless mobile terminal of the present invention, wherein the key functional units are:

Open Wireless Architecture (OWA) Interface—this software unit is utilized for the communication of various processing data and controls (including base-band signal processing, application processing and networking processing, but not limited to) between the mobile terminal and the virtual mobile server, as set forth above. Open architecture is very important for next generation communication systems because it allows different modules and subsystems to be provided by various different vendors through the open interface standards. OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios or modules into one broadband transceiver. In other words, SDR consumes much more power and spectrum in exchange of the system flexibility. From the business point of view, SDR is not a cost-effective solution in commercial wireless communications.

The OWA Interface of the present invention optimizes the transmission efficiency between the mobile terminal and the virtual mobile server, as set forth above.

The aforementioned OWA Interface provides much faster and much more efficient wireless transmissions between the aforementioned mobile terminal and the aforementioned virtual mobile server.

OWA Software Defined Module (SDM)—this functional module supports multiple wireless standards (air-interfaces) for the mobile terminal of the present invention. The module can be stored in the aforementioned mobile terminal, or in the external card or downloaded from the Internet. The OWA of this invention supports open air interfaces so that users can change different wireless standards, including existing standards or future standards, by updating or replacing this SDM module, as set forth above, wherein this SDM module may further contain independent processors or DSP (Digital Signal Processing) components in addition to memory units to facilitate signal processing and/or protocol processing of related standards, etc.

OWA Core this functional module provides basic multi-dimensional OWA open baseband processing of multiple wireless standards to ensure the fully operational and efficient capability of OWA digital transceiver working in an open wireless environment. It also schedules the signal processing tasks between the local processing unit and the remote processing unit in the virtual mobile server, as set forth above.

OWA Application Processing Optimizer—this module schedules the basic applications (such as voice, short message, text, but not limited thereto) locally in the mobile terminal or the rich applications (such as video, big file, large data, web, multimedia, but not limited thereto) remotely through the aforementioned virtual mobile server.

Radio Frequency (RF)/Intermediate Frequency (IF) Subsystem is a portable radio unit with open interface to the main functional units of the mobile terminal of the present invention. This separate open radio subsystem is necessary to support various wireless standards running in different frequency bands, wherein the user may change this radio part in case of needs. Additionally, this open radio subsystem supports new wireless transceiver technologies, for example, smart antennas, MIMO (Multiple Input, Multiple Output), High efficiency power amplifiers, Improved RF modules allowing multiple operating frequencies and improved receiver sensitivity, etc, but not intended to be limited to such technologies.

Network Interface Unit (NIU) is used to provide wireline network connection and wired communication interface for the mobile terminal of the present invention.

User Interface (INF) unit is used to provide user-machine interfaces including keyboard input, touch-screen input, information recognition input, wireless input, optical input and user information output, etc, but not limited thereto.

Mobile Cloud Interface (MCI) unit provides common physical interface for mobile cloud clients and mobile cloud server(s), and is also used as physical interface for power charging, audio, video, data link, input/output and user-control, but not limited thereto.

Display Unit is to generate the results of signal processing, application processing and networking processing, etc.

Sensor Unit is used to provide interfaces to different sensors of security, health, safety, location, automation and intelligence, etc, but not limited thereto.

Digital transceiver unit includes digital down-converter, digital up-converter, analog-to-digital converter and digital-to-analog converter.

It is well known to the ordinary skills in the art by the time of this invention that, the wireline communication is normally based on IP (internet protocol) connection, no matter that the physical wireline transmission is based on ATM (asynchronous transfer mode), Frame-Relay, Fiber Optical or other mediums. In such case, the wireline connection is based on "IP over such broadband high-speed wireline mediums." Because the wireline link is of very high-speed broadband transmission (up to hundreds of Gb/s to Tb/s), we assume the wireline transmission bandwidth is up to unlimited. Hence, we can simply call the wireline connection as IP connection.

However, for wireless transmission limited by the available radio spectrum, the wireless transmission bandwidth is far from "unlimited", and therefore it requires to specify the underlying physical transmission medium in order to support the IP connection. In general, wireless radio transmission is based on circuit-switched (instead of packet-switched) transmission mode, especially for the cellular mobile communications with fast-fading propagation model. Therefore, for general radio transmission technologies (RTTs) and by default, the wireless link is non-IP connection. For example, the cellular CDMA and TDMA mobile communications with fast-fading seamless mobile radio propagation model, the wireless transmission link is a non-IP connection. However, for some non-seamless mobile and short range wireless access networks, because the radio propagation model is slow-fading and the radio transmission environment is very stable, the packet-division (or packet switched) connection becomes possible over the slow-fading and stable circuit-switched transmission medium of the underlying physical layer. Such slow-fading and stable RTTs include the non-mobile WLAN, WPAN, BWA and the slow-mobile BWA and Cellular mobile networks. In order to support the mobile Internet services, by default, the WLAN, WPAN and BWA can support IP connection. For cellular mobile networks, IP connection is possible if the radio propagation model is slow-fading, mobile speed is low and/or the transmission environment is stable, otherwise, the cellular radio link remains the circuit-switched non-IP connection. So, for wireless communications by default, we have IP over WLAN, IP over WPAN, IP over BWA and IP over Cellular Mobile as well as non-IP Cellular Mobile, but not limited thereto.

The aforementioned mobile terminal is a converged open-architecture terminal supporting wireline network, WLAN, WPAN, BWA and cellular mobile network, as set for the above, but not limited thereto.

Figure 3:
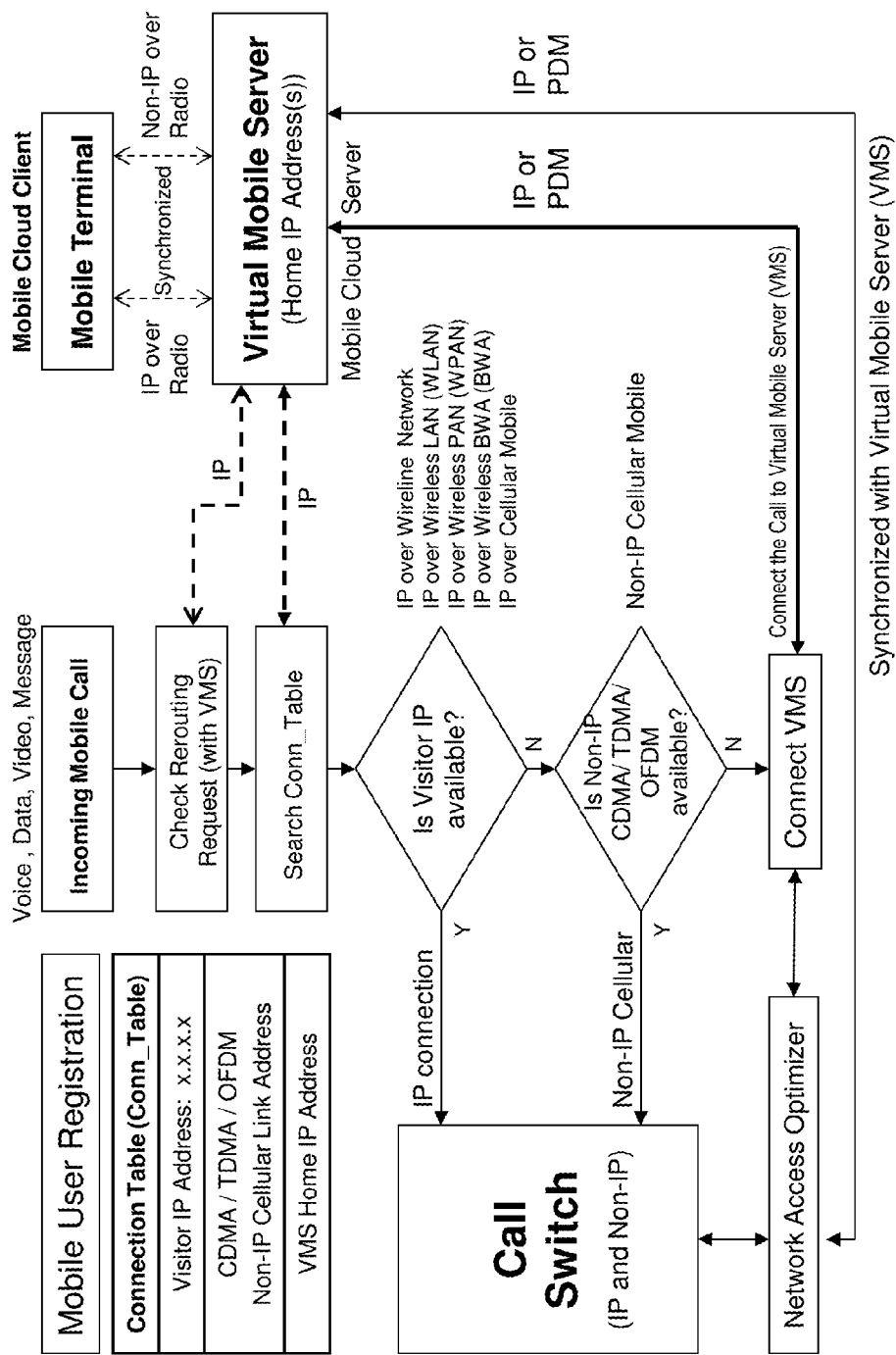
FIG. 3 is the Call Processing Management in Virtual Register and Call Switch (VR/CS) Center with Virtual Mobile Server, wherein the incoming mobile calls (Voice, Data, Video or Message) are further forwarded to the aforementioned mobile terminal through IP link or over the non-IP mobile cellular air link channel. For the outgoing calls, the mobile user can simply dial the destination IP address if there is an IP connection for the mobile terminal, or select the preferred cellular network if no IP connection is available for the mobile terminal.

FIG. 3 shows the incoming Mobile Call Processing Management in the Virtual Register and Call Switch (VR/CS), associated with the mobile terminal of the present invention, wherein the key control procedures are:

Firstly, the aforementioned VR/CS checks whether the mobile terminal has requested VR/CS to reroute its incoming call (voice, data, video or message call) to the virtual mobile server (main server(s) with Internet connection of home IP address(es)), as set forth above, without connecting to the mobile terminal. This request is necessary when the mobile terminal does not have a high-speed IP connection, but the incoming call contains large big file or long video file, etc, or when the mobile terminal is busy and does not want to accept new calls consuming too much wireless bandwidth or system resources, etc. If no such rerouting request is received in the aforementioned VR/CS, then it proceeds to the next step.

The Connection Table (Conn_Table) is frequently updated by the mobile terminal, synchronized with the aforementioned virtual mobile server, as set forth above, through specific network connections, wherein "Visitor IP address" is reported in case of wired network connection or short range wireless access connection (for example, WLAN or WPAN) or broadband wireless access network connection based on IP connection as well as in some situations, the cellular mobile networks in slow mobile, slow fading and/or stable radio transmission environment wherein IP over cellular mobile is possible. If there are no such IP connections available with the aforementioned mobile terminal, the VR/CS, as set forth above, together with associated mobile switching center (or gateway) and base station, communicates with this mobile terminal over the cellular mobile networks, for example, CDMA networks, TDMA networks or OFDM networks, but not limited thereto, wherein the specific cellular air-link channel address is reported to the aforementioned Connection Table.

When the aforementioned mobile terminal reports the aforementioned Visitor IP address to the aforementioned VR/CS and further synchronize with the aforementioned VMS, the global equipment identifier (ID) (such as global mobile phone ID or global mobile device ID, etc) of the aforementioned mobile terminal is thereby reported to the aforementioned VMS to link to the aforementioned Visitor IP address in order to trace the aforementioned mobile terminal in different IP networks of the aforementioned IP connection. This is very useful to trace the terminal equipment when the aforementioned mobile terminal gets lost, stolen or unauthorized use, but not limited thereto.

When an incoming mobile call (including voice, data, video and message call) is received and there is no rerouting request (rerouting to virtual mobile server) from the mobile terminal, the aforementioned VR/CS searches the Connection Table associated with the called mobile terminal (or the destination mobile terminal in this case) of the present invention. If a Visitor IP address is found, the VR/CS dials or re-synchronizes this IP address, through IP Call Switch in VR/CS (or other IP system in different infrastructure), to establish the IP connection accordingly. If this Visitor IP address is not available, and the regular cellular mobile link address (for example, CDMA, TDMA or OFDM channel address) is found and associated with the called destination mobile terminal number, the VR/CS switches to the associated cellular network and connects the associated mobile switching center (or gateway) and base station to establish the communication with the destination mobile terminal, as set forth above, over the cellular mobile air link. This cellular mobile channel can be either static channel or dynamically assigned channel to optimize the wireless spectrum utilization.

Based on the radio propagation model (fast-fading or slow-fading), terminal mobile speed (fast seamless mobile or slow mobile) and radio transmission environment (stable or unstable), the aforementioned cellular mobile communication link can be either IP connection or non-IP connection.

However, it is emphasized that the OWA mobile cloud infrastructure of the present invention utilizes the terms "mobile switching center, mobile gateway, base station, etc", which in the context of the present invention, is meant to include the aforementioned existing CDMA system, TDMA/GSM system, OFDM system, or any other mobile communication infrastructure utilizing different network topology and/or network architecture with different terms which may or may not have all of the functional characteristics of existing CDMA or TDMA or OFDM standards. As such, the OWA mobile cloud infrastructure of the present invention is not meant to be limited to current mobile cellular communication infrastructure, and the subsequent specific description utilization and explanation of certain characteristics previously recited as being characteristics of a mobile switching center or base station or mobile gateway or mobile router are not intended to be limited to such technology.

If after searching the Connection Table, as set forth above, both Visitor IP address and cellular mobile link address (including CDMA or TDMA or OFDM channel) are not found, the aforementioned VR/CS has to forward the incoming call, over IP connection, to the aforementioned virtual mobile server, wherein a fixed Home IP address is stored in the aforementioned Connection Table.

Therefore, the incoming mobile call processing management in VR/CS (or any Mobile Gateway, Mobile Switch in different terms) of the present invention requires the minimum modification of the existing mobile communication infrastructure.

The aforementioned mobile terminal of the present invention searches for the access networks in the priority order of Wired network, Wireless LAN (WLAN), Wireless PAN (WPAN), Wireless MAN (or called BWA), TDMA, CDMA and OFDM, for example but not limited to, to maximize the wireless spectrum utilization efficiency and broadband services. However, this access control order can be re-defined by the mobile user with the mobile terminal of the present invention. Additionally, the OWA mobile terminal of the present invention has the function to frequently search for the higher priority network access mode whenever the connection is in the low priority mode to optimize the network access control for the mobile terminal of the present invention.

The cellular mobile networks may include IP connection for slow-mobile, slow-fading and/or stable radio transmission environment, and non-IP traditional circuit-switched wireless connection if the mobile speed is too fast or the radio propagation model is of fast-fading.

Based on different underlying physical transmission mediums, the IP connection of the aforementioned mobile terminal can be IP over wireline, IP over WLAN, IP over WPAN, IP over BWA or IP over Cellular Mobile, but not limited thereto.

The aforementioned IP connection refers to any connection of the Packet Division Multiplexed (PDM) networks including IP network and other packet-switched networks. By default in the present invention, PDM refers to IP or other packet-switched connections.

When multiple cellular networks are available for the aforementioned mobile terminal to select the optimal cellular mobile link(s), either in IP connection or in non-IP connection, the selection method of cellular networks is based on the overall criteria of Best-of-Effort, Simplicity and Convergence, Inter-networking QoS (quality of service), Network Performance, Cost Effectiveness and Customer Services for each mobile user, but not limited thereto. Such network selection table is maintained in the Network Access Optimizer of the aforementioned VR/CS, synchronized with the virtual mobile server, as set forth above.

Whenever an IP connection is available, the aforementioned mobile terminal synchronizes with the virtual mobile server in a real-time and optimized manner.

The aforementioned IP Connection is selected and optimized by the aforementioned Mobile Terminal in the default priority order of IP over wireline network, IP over WLAN, IP over WPAN, IP over BWA and IP over cellular mobile network, as set forth above, to maximize the wireless spectrum utilization efficiency, but the aforementioned priority order can be changed by the aforementioned mobile user.

The aforementioned IP Connection for the aforementioned mobile terminal can be roamed among IP networks of wireline network, WLAN, WPAN, BWA and cellular mobile network, as set forth above, in the aforementioned priority order when the aforementioned mobile terminal of the aforementioned mobile user moves across different IP networks, as set forth above.

The Call Switch unit in the aforementioned VR/CS manages the IP connecting and Non-IP connecting functions.

The Mobile User Registration in the aforementioned VR/CS includes Mobile User Identifier (ID), Mobile User's Connection Table, Mobile User's Virtual Mobile Sever IP Address.

The aforementioned mobile terminal can connect to other mobile terminals in an Ad-Hoc or Mesh network manner, synchronized by the aforementioned VR/CS and the aforementioned VMS whenever the aforementioned IP connection is available.

The aforementioned mobile terminal can seamlessly roam among WLAN, WPAN, BWA and cellular mobile network, as set forth above, synchronized by the aforementioned VR/CS and the aforementioned VMS whenever the aforementioned IP connection is available.

In summary, the aforementioned Open Wireless Architecture (OWA) Mobile Cloud method comprises:

a) If the aforementioned Mobile Terminal of the aforementioned mobile user has an IP (internet protocol) Connection established, it reports its Visitor IP address to its corresponding Virtual Register and Call Switch (VR/CS), as set forth above, and the aforementioned Mobile Terminal can connect with backbone Internet network and synchronize with its corresponding Virtual Mobile Server (VMS), as set forth above, through the aforementioned IP Connection, and b) If the aforementioned Mobile Terminal does not have the aforementioned IP Connection established, it connects to the aforementioned VR/CS through specific Non-IP cellular mobile link selected, optimized and managed by the aforementioned VR/CS.

Figure 4:
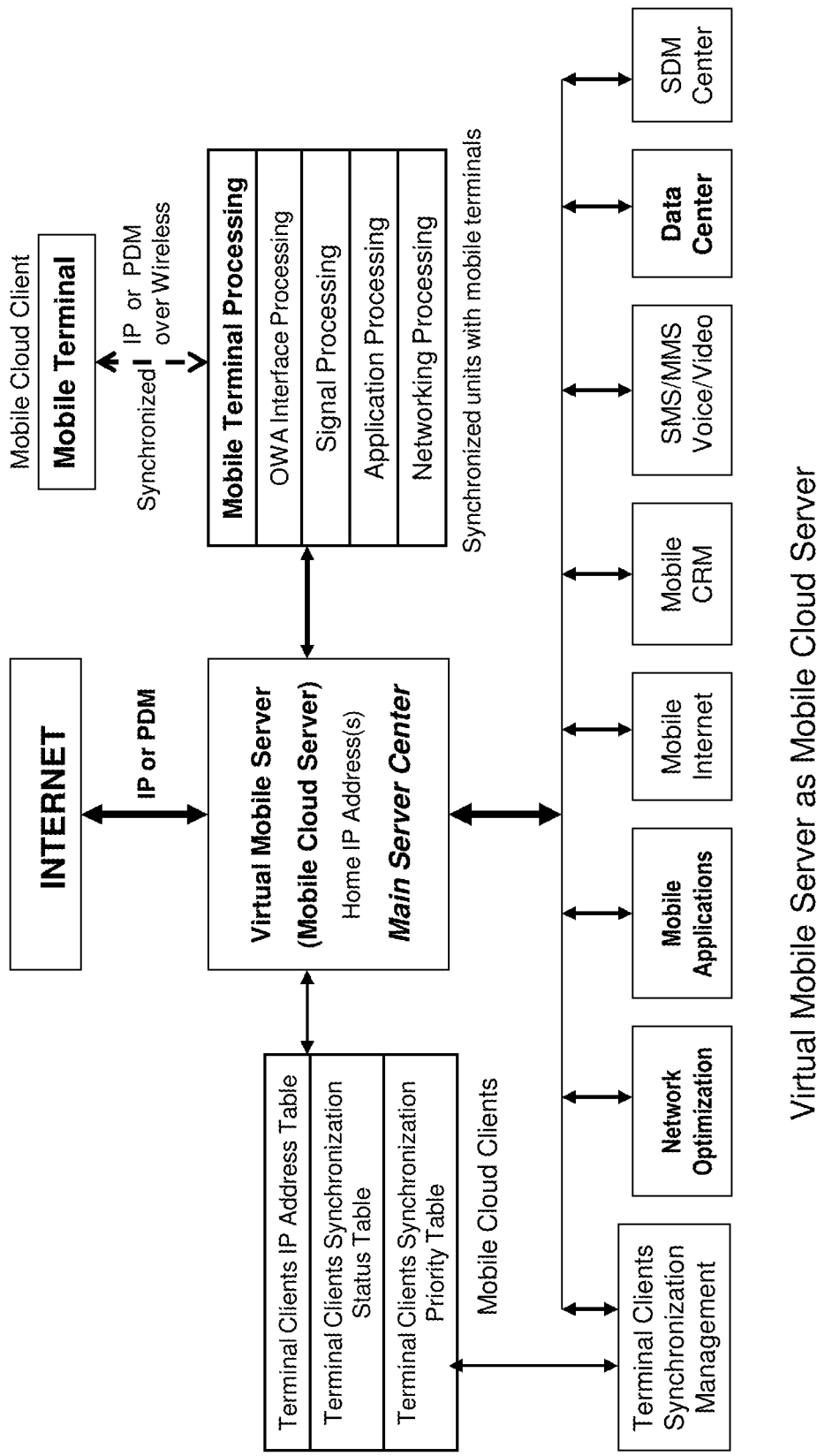
FIG. 4 introduces the Virtual Mobile Server (VMS) as the mobile cloud server, wherein the mobile terminal processing tasks are executed in this server over the cloud which include the OWA interface processing, signal processing, application processing and networking processing. It also processes other functions for the mobile terminal(s) of the present invention. The VMS is located in the main server center or in the Data center, supporting groups of mobile terminals or mobile users.

FIG. 4 introduces to utilize a computer server(s) either in the server center or data center, with Internet access, as a Virtual Mobile Server for the mobile terminal of the present invention, wherein the key disclosures are:

The Virtual Mobile Server, basically a Computer Server, has a fixed Home IP address or an assigned roaming IP address by the aforementioned Home IP address, connecting to the wireline Internet through Fibre, Cable Modem, Ethernet or DSL (Digital Subscriber Loop), but not limited thereto. This virtual mobile server becomes the mobile cloud server for one or multiple mobile terminals, as set forth above, which become the mobile cloud clients.

The aforementioned Virtual Mobile Server(s) supporting group or many of aforementioned mobile terminals can locate in the computer servers' center or in the network data center.

The Virtual Mobile Server, as set forth above, comprises an important Mobile Terminal Processing Unit in operating the OWA Interface processing, Signal processing, Application processing and Networking processing for the mobile terminal, as set forth above. The abovementioned Virtual Mobile Server tries to handle the processing tasks for the mobile terminal, as set forth above, as much as possible when the IP connection is established between them in order to simplify the system implementation and improve the system performance of the mobile terminal, as set forth above.

The aforementioned Mobile Terminal Processing Unit further operates the following functions with the aforementioned mobile terminal: bandwidth optimization and synchronization, signals synchronization, applications synchronization as well as network optimization and synchronization.

The aforementioned Mobile Terminal Processing Unit connects to the aforementioned mobile terminal through traditional IP connection, improved IP connection such as IPv6 or other Packet Division Multiplexed (PDM) network connection.

The Virtual Mobile Server, as set forth above, maintains a synchronized and real-time copy of the aforementioned Connection Table from the aforementioned Virtual Register and Call Switch (VR/CS).

The Virtual Mobile Server, as set forth above, also synchronizes with the aforementioned mobile terminal when the IP connection is established between them.

One Virtual Mobile Server, as set forth above, can support one or multiple or group of mobile terminals of the present invention, wherein many such mobile terminals can share the same Virtual Mobile Server, as set forth above.

The Virtual Mobile Server, as set forth above, supports such important services and applications as Network Optimization, Mobile Secretary, Mobile Applications, Mobile Internet Optimization, Mobile Internet Applications, Mobile Customer Relations Management (CRM), Voice/Video server, Short Message Service (SMS) and Multimedia Message Service (MMS) server, Game Center, Data Center, SDM Center, etc., but not limited thereto.

The aforementioned Mobile Applications unit and Data Centers are utilized to host public or private mobile application platforms, on-line stores, on-line servers, cloud servers, development suites, users data and application data, but not limited thereto.

The aforementioned Mobile Applications unit also manages the optimization processing of applications and contents transmitted from the virtual mobile server to the mobile terminal, as set forth above, to optimize the system performance, save the transmission bandwidth and minimize the power consumption in the aforementioned mobile terminal.

The aforementioned Mobile Internet Optimization module processes the improved mobile Internet browsing, searching, networking, accelerating, computing and other applications for the aforementioned mobile terminal either in the synchronized mode when the IP connection is available, or in the unsynchronized mode when the IP connection is not available.

The aforementioned Network Optimization module processes the cellular network selection and network access optimization for each mobile user wherein the network access table is updated and synchronized with the aforementioned VR/CS real-timely.

The Virtual Mobile Server, as set forth above, also provides the mobile terminal of the present invention of Special Services Management such as Location management, Emergency call management, Security and Safety management, Sensor Networks and Systems management, Services Optimization, Digital spectrum management, and mobile cloud Operation and Maintenance management, etc., but not limited thereto.

The Virtual Mobile Server, as set forth above, can manage the aforementioned mobile terminal(s) to organize a sensor networks when the IP connection is available between the virtual mobile server and the mobile terminal(s), as set forth above.

The Virtual Mobile Server, as set forth above, can manage or control one or multiple aforementioned mobile terminal(s) connect to another or other multiple aforementioned mobile terminal(s) in an Ad-Hoc or Mesh network manner when the IP connection is available among them.

The Virtual Mobile Server, as set forth above, also provides Terminal Clients Synchronization Management to schedule and control the synchronization process between the aforementioned mobile terminal and other mobile cloud clients (computer terminal, TV terminal and other terminals, as set forth above). All of the aforementioned mobile cloud clients are centrally synchronized to the aforementioned virtual mobile server.

The mobile terminal, as set forth above, frequently reports its current terminal IP address (or called Visitor IP address) to the aforementioned virtual mobile server when the IP connection is established, and this aforementioned terminal IP address is updated in the aforementioned virtual mobile server when the aforementioned mobile terminal moves to different access point of wired network, wireless LAN, wireless PAN or wireless MAN (or called BWA) or some cellular mobile networks with IP connection.

The synchronized IP or PDM link between the mobile terminal and the virtual mobile server, as set forth above, include IP over WLAN, IP over WPAN, IP over BWA and IP over Cellular Mobile network, but not limited thereto.

Lastly, any computer server or network server with Internet connection and with an IP address can be configured to be an aforementioned Virtual Mobile Server, associated with the mobile terminal(s) of the present invention.

The OWA Virtual Mobile Server as the Mobile Cloud Server of the present invention is not meant to be limited to the aforementioned system architecture, and the subsequent specific description utilization and explanation of certain characteristics previously recited as being characteristics of this system architecture are not intended to be limited to such technologies.

The Mobile User Identifier (ID) can be mobile user's telephone number, mobile user's personal ID, mobile user's domain name or other defined ID information, but not limited thereto.

FIG. 5 is the transmission framework of the OWA Interface for the OWA mobile cloud infrastructure, wherein the aforementioned OWA Interface comprises:

1. OWA Baseband Signal Processing (SIG) Interface including OWA SIG Header, OWA SIG Information Body and OWA SIG End 2. OWA Application Processing (APP) Interface including OWA APP Header, OWA APP Information Body and OWA APP End 3. OWA Networking Processing (NET) Interface including OWA NET Header, OWA NET Information Body and OWA NET End The aforementioned OWA Interface is an open module to maximize the transmission efficiency between the aforementioned mobile terminal and the aforementioned virtual mobile server. The aforementioned OWA Interface can be minimized or reduced if any processing task (SIG, APP or NET, as set forth above) is not requested or not in use, in order to further increase the transmission efficiency and reduce the transmission overhead.

The aforementioned OWA Interface is the communication information interface between the aforementioned mobile terminal and the aforementioned virtual mobile server.

FIG. 6 describes the OWA Application Optimizer in the OWA mobile terminal system of the present invention.

To simplify the mobile terminal design and implementation, it is necessary to move the processing tasks out of the mobile terminal system, and to the mobile cloud server which in the present invention called virtual mobile server. Application processing including video processing, multimedia processing, gaming processing, mobile Internet processing, but not limited thereto, consumes much processing power and system resources for the mobile terminal, and therefore degrades the system performance.

When a high-speed IP connection is established between the aforementioned mobile terminal and the aforementioned virtual mobile server, the aforementioned OWA Application Optimizer moves the rich applications (large data, video, big file, web, multimedia, etc) processing tasks remotely to the aforementioned virtual mobile server for processing, then retrieve the processing results back to the aforementioned mobile terminal or save the results in the aforementioned virtual mobile server.

When the high-speed IP connection is not available between the aforementioned mobile terminal and the aforementioned virtual mobile server, the aforementioned OWA Application Optimizer limits the applications to voice, message, text and short web service locally in the aforementioned mobile terminal. In this case (low-speed IP connection or no IP connection is available), the aforementioned OWA Application Optimizer may request the aforementioned VR/CS or Mobile Gateway to reroute the incoming rich mobile call which consumes much processing power and/or transmission bandwidth, such as video call, big file, large data, etc, to the aforementioned virtual mobile server directly without proceeding to the aforementioned mobile terminal to save system and transmission resources. Then, after the IP connection with enough bandwidth is established between the aforementioned mobile terminal and the aforementioned virtual mobile server, the aforementioned mobile terminal can retrieve the incoming calls from the aforementioned virtual mobile server.

The IP connection, as set forth above, refers to the connection to the wireline network, wireless LAN, wireless PAN, wireless MAN (BWA) or some cellular mobile networks, as set forth above, which is a broadband high-speed connection to the Internet.

Figure 7:
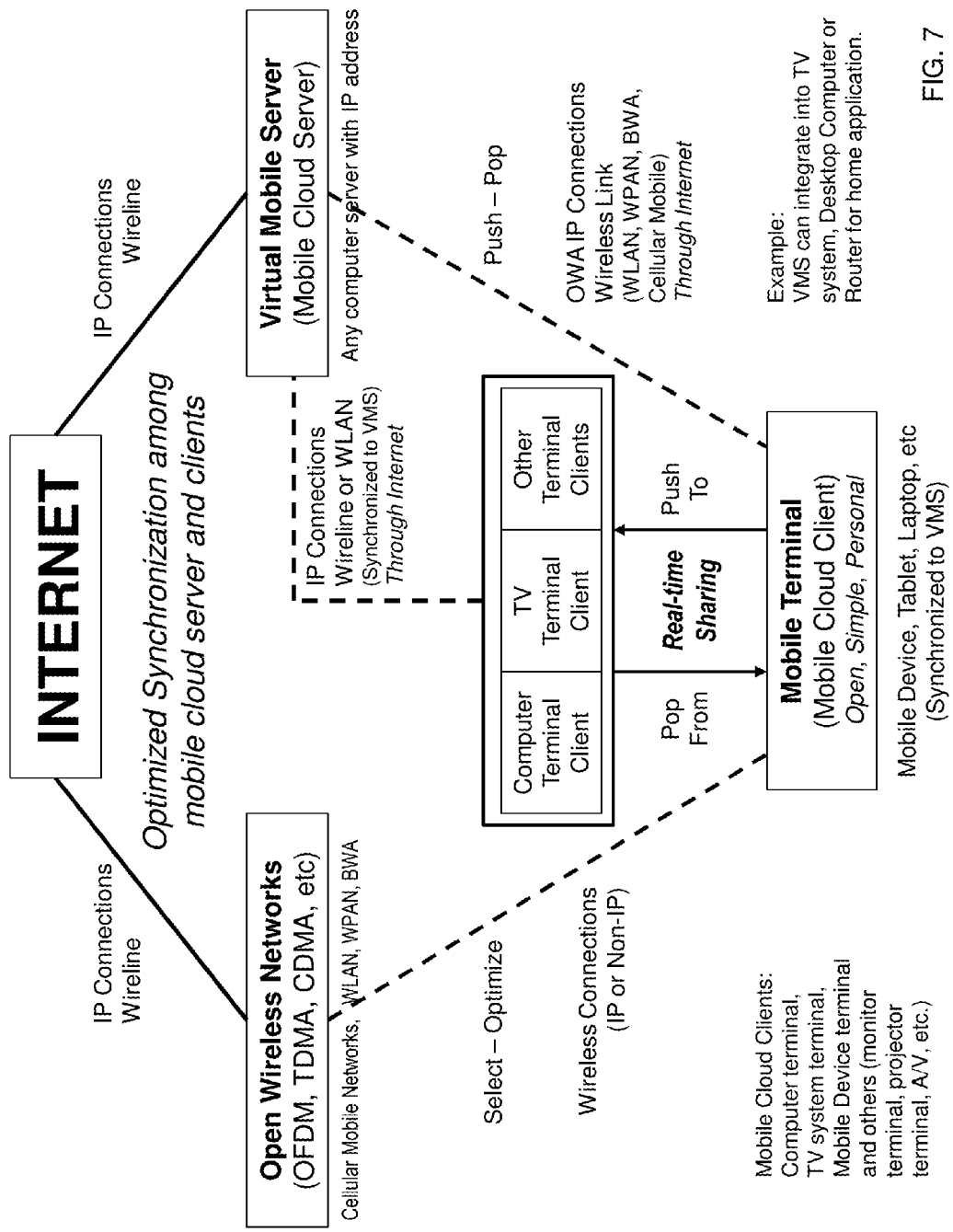
FIG. 7 discloses an optimized synchronization architecture among mobile cloud server and mobile cloud clients.

FIG. 7 introduces an optimized synchronization architecture among mobile cloud server (virtual mobile server) and mobile cloud clients (mobile terminal, computer terminal, television terminal, monitor terminal and projector terminal, etc).

The aforementioned computer terminal, TV terminal and other terminals are synchronized to the aforementioned Virtual Mobile Server with the aforementioned IP connections through the aforementioned wireline network or WLAN with synchronization priority order preset or reset by the users.

By synchronizing the mobile terminal, computer terminal, TV terminal and other terminals to virtual mobile server through IP connections, as set forth above, the aforementioned mobile terminal can push its applications and contents to or pop interested applications and contents from the computer terminal, TV terminal or other terminals, as set forth above, through the aforementioned virtual mobile server. The push-pop priority order list of the aforementioned computer terminal, TV terminal and other terminals is defined and updated by the user.

All of the aforementioned mobile cloud clients including mobile terminal, computer terminal, TV terminal and other terminals, as set forth above, are fully synchronized to the aforementioned virtual mobile server (mobile cloud server) when the aforementioned IP connection is established between mobile cloud clients and mobile cloud server, as set forth above, fully controlled by Terminal Clients Synchronization Management unit in the aforementioned virtual mobile server (mobile cloud server).

The aforementioned Terminal Clients Synchronization Management in the aforementioned virtual mobile server comprises the following methods:

1) The aforementioned mobile cloud client(s) connect to the aforementioned virtual mobile server when the aforementioned IP connection is established for the aforementioned mobile cloud client(s);

2) The aforementioned mobile cloud client(s) report its/their IP address(es) to the aforementioned virtual mobile server in the Terminal Clients IP Address Table;

3) When the aforementioned mobile terminal has the aforementioned IP connection, it always keeps synchronized to the aforementioned virtual mobile server;

4) By default, the aforementioned other mobile cloud clients including the aforementioned computer terminal client and TV terminal client, are not synchronized to the aforementioned virtual mobile server, even though they have the aforementioned IP connections;

5) After the aforementioned mobile terminal enables push/pop request to the aforementioned other mobile cloud client(s), the aforementioned virtual mobile server will synchronize with the aforementioned other mobile cloud client(s);

6) After the aforementioned other mobile cloud client(s) is/are synchronized to the aforementioned virtual mobile server, both the aforementioned mobile terminal and the aforementioned other mobile cloud client(s) are fully synchronized through the aforementioned virtual mobile server, and the aforementioned mobile terminal can push applications and contents to or pop applications and contents from the aforementioned other mobile cloud client(s);

7) After the aforementioned mobile terminal disables push/pop request to the aforementioned other mobile cloud client(s), the aforementioned virtual mobile server will close synchronization with the aforementioned other mobile cloud client(s);

8) When the aforementioned other mobile cloud client(s) is/are not synchronized to the aforementioned virtual mobile server, it/they remain connected to Internet, further to the aforementioned virtual mobile server through the aforementioned IP connection.

The aforementioned other mobile cloud clients include computer terminal client, TV terminal client, monitor terminal client and projector terminal client, as set forth above, but not limited thereto, are different from the aforementioned mobile terminal client in both connection to Internet and synchronization to the aforementioned virtual mobile server wherein the aforementioned mobile terminal is always synchronized to the aforementioned virtual mobile server through the aforementioned OWA IP connection.

The aforementioned other mobile cloud clients can also synchronize each other by sending individual synchronization request to the aforementioned virtual mobile server and get synchronized through the aforementioned virtual mobile server.

The aforementioned push/pop applications and contents include real-time voice, video and multimedia, or non-real-time message, data, file, webpage, but not limited thereto.

The aforementioned other mobile cloud clients can also retrieve, copy, play the saved applications or contents of the aforementioned mobile terminal directly from the aforementioned virtual mobile server.

The aforementioned mobile terminal client can request the aforementioned virtual mobile server to remain always synchronized with one or more the aforementioned other mobile cloud client(s) to ensure seamless handover, synchronous operation and lossless switch of shared applications and contents by setting synchronization status ON for the aforementioned requested other mobile cloud client(s) in a Terminal Clients Synchronization Status Table of the aforementioned virtual mobile server.

The aforementioned mobile terminal client can also request the aforementioned virtual mobile server to set the synchronization priority list for the aforementioned other mobile cloud clients in a Terminal Clients Synchronization Priority Table of the aforementioned virtual mobile server, and the aforementioned synchronization priority list can be updated or re-set by users through the aforementioned mobile terminal client.

The aforementioned virtual mobile server as mobile cloud server can be any computer or networking server in the cloud infrastructure seamlessly synchronized with the aforementioned mobile terminal and the aforementioned other mobile cloud clients including computer terminal client and TV terminal client.

The synchronization among the aforementioned mobile cloud clients is seamless because each mobile cloud client is fully synchronized to the aforementioned virtual mobile server, and fully controlled by the aforementioned virtual mobile server.

FIG. 8 introduces an integrated smart home and smart office platform by OWA mobile cloud architecture wherein a method for terminal clients management and a method for terminal clients synchronization are disclosed for sharing applications, services and contents real-timely between mobile terminal client(s) and other mobile cloud clients.

The terminal clients management for integrated smart home and smart office platform of mobile cloud infrastructure comprises the following methods:

a) registering mobile cloud clients including mobile terminal (MT) clients, home computer clients, home TV (television) clients, home A/V (audio/video) sub-server clients, home IoT (Internet of Thing) sub-server clients, office computer clients, office TV clients and mobile laptop clients to virtual mobile server (VMS) as mobile cloud server, b) performing authorization process in the VMS to the MT clients and other mobile cloud clients including the home computer clients, the home TV clients, the home NV sub-server clients, the home IoT sub-server clients, the office computer clients, the office TV clients and the mobile laptop clients, c) connecting the VMS with the MT clients and the other mobile cloud clients if the MT clients and the other mobile cloud clients pass the authorization process and their IP (Internet Protocol) addresses are registered in Terminal Clients IP Address Table of the VMS, d) sharing applications, services and contents between the MT clients and the other mobile cloud clients, or among the other mobile cloud clients, by synchronizing specific or associated mobile cloud clients through the VMS, controlled by the MT client(s) or administrated by the VMS, e) dynamically optimizing wireless connections for the mobile cloud clients by open wireless architecture (OWA) with Quality of Wireless connections (QoW), f) dynamically optimizing the shared applications, services and contents in the form of real-time voice, audio, video and multimedia or non-real-time message, audio, video, data, file and webpage, under the control of the QoW for the wireless connections, and g) dynamically optimizing synchronization of the specific or associated mobile cloud clients with the VMS by frequently checking Terminal Clients Synchronization Status Table and Terminal Clients Synchronization Priority Table with Terminal Clients Synchronization Management unit in the VMS.

The aforementioned QoW is based on combined consideration of cost, bandwidth and spectrum efficiency wherein an acceptable QoW means a good transmission bandwidth with good cost-effectiveness and spectrum-efficiency including the acceptable QoW with IP (Internet Protocol) connection over WLAN (wireless local area network), and an unacceptable QoW means a poor transmission bandwidth or poor cost-effectiveness though transmission bandwidth could be good, or poor spectrum efficiency, including the unacceptable QoW with the IP connection over cellular mobile networks but costing too much for mobile user of the mobile terminal, wherein the cellular mobile networks include TDMA (time division multiplex access), CDMA (code division multiplex access), OFDM (orthogonal frequency division multiplex) and PDMA (packet division multiplex access).

The aforementioned IP connection means IP over wireline connection or IP over wireless connection.

The aforementioned optimizing shared applications, services and contents means that if the QoW is acceptable for the wireless connections, the MT can share rich contents including large video, big file, big multimedia or real-time contents with the other mobile cloud clients, otherwise if the QoW is not acceptable for the wireless connections, the MT is limited to share small-size contents such as text, short message, small photo and small file with the other mobile cloud clients, and when the QoW becomes acceptable for the wireless connections, the MT will resume sharing the rich contents with the other mobile cloud clients.

The aforementioned sharing applications, services and contents can share the MT's mobile services and applications including available mobile bandwidth, available data plan, available mobile resources, available mobile services and available mobile applications with the other mobile cloud clients.

The aforementioned sharing applications, services and contents means that the other mobile cloud clients or other the MT client(s) can make mobile phone calls, send mobile texts and messages, have mobile Internet services or have mobile data services through the MT client by utilizing the MT's the cellular mobile network with the MT's SIM (Subscriber Identity Module) card.

The aforementioned sharing applications, services and contents means that the other mobile cloud clients or other the MT client(s) can receive mobile phone calls, receive mobile texts and messages or receive mobile Internet contents through the MT client by utilizing the MT's the cellular mobile network with the MT's SIM card.

The aforementioned sharing applications, services and contents includes privately sharing, private conferencing, private broadcasting and private entertaining mobile contents among the mobile cloud clients.

The aforementioned VMS can be integrated into computer, TV, router or gateway and the VMS is a user-centric private secured server at home or in enterprise, shared by multiple the mobile cloud clients.

The aforementioned MT client is also remote controller or console for the other mobile cloud clients as well as the home NV sub-server clients and the home IoT sub-server clients.

The aforementioned Terminal Clients Synchronization Status Table and the Terminal Clients Synchronization Priority Table are updated and controlled by the MT clients, which determine the synchronization status and priority of the other mobile cloud clients.

The aforementioned home IoT sub-server controls and manages IoT sensing nodes (sensors of temperature, fire, safety, security, etc), networking nodes (connecting various IoT devices) and control nodes (controlling various IoT devices) distributed in the entire home space.

The aforementioned conferencing can be provided by synchronizing participating the mobile cloud clients with the VMS, and moderated or managed by the MT client(s).

The aforementioned MT clients connect to Internet, further connect to the VMS through OWA IP connection, wherein, the OWA IP connection refers to the IP connection to Internet through IP over wireline network, IP over the WLAN, IP over WPAN (wireless personal access network), IP over BWA (broadband wireless access) or IP over the cellular mobile network.

The aforementioned home NV sub-server is utilized to share favorable audio and video contents among the mobile cloud clients through the VMS, wherein, the MT client(s) can manage and control the different audio and video contents to be shared in the different other mobile cloud clients for the purpose of parental control, privacy control, customer control, enterprise control or business control.

The aforementioned home NV sub-server contains various NV contents in the form of graphics frameworks, animation frameworks, 3D (three dimensions) frameworks, media frameworks and entertainment frameworks to be shared among the aforementioned mobile cloud clients.

The aforementioned sharing applications, services and contents can be shared in/with different phases, timestamps, frames, layers, backgrounds, soundtracks or streams for animation, 3D or A/V intelligence, among different multiple mobile cloud clients.

The aforementioned sharing applications, services and contents refers to real-time sharing with full synchronization of the applications, services and contents, and non-real-time sharing does not require synchronization.

Because the aforementioned VMS is fully controlled and owned by the users' themselves at private home or in private enterprise, the shared applications, services, contents and data through the VMS is highly secured and protected. Generally the VMS is physically located in user's private home or private office for the best security protection.

The terminal clients synchronization for integrated smart home and smart office platform of mobile cloud infrastructure comprises the following methods:

a) connecting mobile cloud clients including mobile terminal (MT) clients, home computer clients, home TV (television) clients, home NV (audio/video) sub-server clients, home IoT (Internet of Thing) sub-server clients, office computer clients, office TV clients and mobile laptop clients to Virtual Mobile Server (VMS) as mobile cloud server when Internet Protocol (IP) connection is established to the mobile cloud clients, b) reporting IP addresses of the mobile cloud clients to the VMS in Terminal Clients IP Address Table of the VMS, c) always keeping the MT client(s) synchronized to the VMS when the MT client(s) have the IP connection, d) keeping other mobile cloud clients including the home computer clients, the home TV clients, the home A/V sub-server clients, the home IoT sub-server clients, the office computer clients, the office TV clients and the mobile laptop clients not synchronized to the VMS even though the other mobile cloud clients have the IP connections, e) synchronizing the VMS with specific the other mobile cloud client(s) after the MT client enables sharing request to the specific other mobile cloud client(s), f) keeping both the MT client and the specific other mobile cloud client(s) fully synchronized through the VMS and enabling the MT client to share applications, services and contents with the specific other mobile cloud client(s) after the specific other mobile cloud client(s) are synchronized to the VMS, g) closing synchronization of the VMS with the specific other mobile cloud client(s) after the MT client disables the sharing request to the specific other mobile cloud client(s), and h) keeping the other mobile cloud clients connected to Internet, further to the VMS through the IP connection when the other mobile cloud clients are not synchronized to the VMS.

The aforementioned sharing request refers to real-time sharing with full synchronization of the applications, services and contents between the MT client and the other mobile cloud clients. For non-real-time sharing, it is not required to synchronize the mobile cloud clients, as set forth above.

All of the mobile cloud clients are registered with their locations including GPS (Global Positioning System), IP address, home or office address of home or office clients or sub-server, etc.

Because the aforementioned VMS is fully controlled and owned by the users' themselves at private home or in private enterprise, the shared applications, services, contents and data through the VMS is highly secured and protected. Generally the VMS is physically located in user's private home or private office for the best security protection.

The mobile users, by their MT clients as set forth above, share interested applications, services and contents with their families, relatives, colleagues and friends at home or in enterprise by other mobile cloud clients, as set forth above, to build integrated home and office social sharing networks.

Two-way interactive sharing, as set forth above, provides private conferencing services among the aforementioned mobile cloud clients or between the MT client(s) and the aforementioned other mobile cloud clients.

The aforementioned sharing among the aforementioned mobile cloud clients include real-time sharing and non-real-time sharing of the applications, services and contents, as set forth above.

The aforementioned sharing of the applications, services and contents among the aforementioned mobile cloud clients provides secured solutions for mobile enterprise users or enterprise mobility services and applications between homes and enterprises.

The aforementioned integrated smart home and smart office platform provides smart life automation and intelligence converging mobile, cloud and smart lifestyle technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for terminal clients management of mobile cloud infrastructure, said method comprising:
   a) registering mobile cloud clients including mobile terminal (MT) clients, home computer clients, home TV (television) clients, home A/V (audio/video) sub-server clients, home IoT (Internet of Thing) sub-server clients, office computer clients, office TV clients and mobile laptop clients to virtual mobile server (VMS) as mobile cloud server,
   b) performing authorization process in said VMS to said MT clients and other mobile cloud clients including said home computer clients, said home TV clients, said home A/V sub-server clients, said home IoT sub-server clients, said office computer clients, said office TV clients and said mobile laptop clients,
   c) connecting said VMS with said MT clients and said other mobile cloud clients if said MT clients and said other mobile cloud clients pass said authorization process,
   d) sharing applications, services and contents between said MT clients and said other mobile cloud clients, or among said other mobile cloud clients, by synchronizing associated said mobile cloud clients through said VMS, controlled by said MT client(s) or administrated by said VMS,
   e) dynamically optimizing wireless connections for said mobile cloud clients by open wireless architecture (OWA) with Quality of Wireless connections (QoW),
   f) dynamically optimizing said shared applications, services and contents in the form of real-time voice, audio, video and multimedia or non-real-time message, audio, video, data, file and webpage, under the control of said QoW for said wireless connections, and
   g) dynamically optimizing synchronization of said associated mobile cloud clients with said VMS by frequently checking Terminal Clients Synchronization Status Table and Terminal Clients Synchronization Priority Table with Terminal Clients Synchronization Management unit in said VMS.

2. The method as recited in claim 1, wherein said QoW is based on combined consideration of cost, bandwidth and spectrum efficiency wherein an acceptable said QoW means a good transmission bandwidth with good cost-effectiveness and spectrum-efficiency including acceptable said QoW with IP (Internet Protocol) connection over WLAN (wireless local area network), and an unacceptable said QoW means a poor transmission bandwidth or poor cost-effectiveness though transmission bandwidth could be good, or poor spectrum efficiency, including unacceptable said QoW with said IP connection over cellular mobile networks but costing too much for mobile user of said mobile terminal, wherein said cellular mobile networks include TDMA (time division multiplex access), CDMA (code division multiplex access), OFDM (orthogonal frequency division multiplex) and PDMA (packet division multiplex access).

3. The method as recited in claim 2, wherein said IP connection means IP over wireline connection or IP over wireless connection.

4. The method as recited in claim 1, wherein said optimizing shared applications, services and contents means that if said QoW is acceptable for said wireless connections, said MT can share rich contents including large video, big file, big multimedia or real-time contents with said other mobile cloud clients, otherwise if said QoW is not acceptable for said wireless connections, said MT is limited to share small-size contents such as text, short message, small photo and small file with said other mobile cloud clients, and when said QoW becomes acceptable for said wireless connections, said MT will resume sharing said rich contents with said other mobile cloud clients.

5. The method as recited in claim 1, wherein said sharing applications, services and contents can share said MT's mobile services and applications including available mobile bandwidth, available data plan, available mobile resources, available mobile services and available mobile applications with said other mobile cloud clients.

6. The method as recited in claim 1, wherein said sharing applications, services and contents means that said other mobile cloud clients or other said MT client(s) can make mobile phone calls, send mobile texts and messages, have mobile Internet services or have mobile data services through said MT client by utilizing said MT's said cellular mobile network with said MT's SIM (Subscriber Identity Module) card.

7. The method as recited in claim 1, wherein said sharing applications, services and contents means that said other mobile cloud clients or other said MT client(s) can receive mobile phone calls, receive mobile texts and messages or receive mobile Internet contents through said MT client by utilizing said MT's said cellular mobile network with said MT's SIM card.

8. The method as recited in claim 1, wherein said sharing applications, services and contents includes privately sharing, private conferencing, private broadcasting and private entertaining mobile contents among said mobile cloud clients.

9. The method as recited in claim 8, wherein said private conferencing can be provided by synchronizing participating said mobile cloud clients with said VMS, and moderated or managed by said MT client(s).

10. The method as recited in claim 1, wherein said VMS can be integrated into computer, TV, router or gateway and said VMS is a user-centric private secured server at home or in enterprise, shared by multiple said mobile cloud clients.

11. The method as recited in claim 1, wherein said MT client is also remote controller or console for said other mobile cloud clients as well as said home A/V sub-server clients and said home IoT sub-server clients.

12. The method as recited in claim 1, wherein said Terminal Clients Synchronization Status Table and said Terminal Clients Synchronization Priority Table are updated and controlled by said MT clients, which determine the synchronization status and priority of said other mobile cloud clients.

13. The method as recited in claim 1, wherein said home IoT sub-server controls and manages IoT sensing nodes (sensors of temperature, fire, safety, security, etc), networking nodes (connecting various IoT devices) and control nodes (controlling various IoT devices) distributed in the entire home space.

14. The method as recited in claim 1, wherein said MT clients connect to Internet, further connect to said VMS through OWA IP connection, wherein, said OWA IP connection refers to said IP connection to Internet through IP over wireline network, IP over said WLAN, IP over WPAN (wireless personal access network), IP over BWA (broadband wireless access) or IP over said cellular mobile network.

15. The method as recited in claim 1, wherein said home A/V sub-server is utilized to share favorable audio and video contents among said mobile cloud clients through said VMS, wherein, said MT client(s) can manage and control different said audio and video contents to be shared in different said other mobile cloud clients for the purpose of parental control, privacy control, customer control, enterprise control or business control.

16. The method as recited in claim 1, wherein said sharing applications, services and contents refers to real-time sharing with full synchronization of said applications, services and contents, and non-real-time sharing does not require synchronization.

17. The method as recited in claim 16, wherein two-way interactive sharing of said real-time sharing provides private conferencing services among said mobile cloud clients or between said MT client(s) and said other mobile cloud clients.

18. The method as recited in claim 1, wherein said VMS is fully controlled and owned by users' themselves at private home or in private enterprise, and so shared said applications, services and contents through said VMS is highly secured and protected.

19. The method as recited in claim 1, wherein method of said terminal clients synchronization management in said Terminal Clients Synchronization Management unit comprises:
  a) connecting mobile cloud clients including mobile terminal (MT) clients, home computer clients, home TV (television) clients, home A/V (audio/video) sub-server clients, home IoT (Internet of Thing) sub-server clients, office computer clients, office TV clients and mobile laptop clients to Virtual Mobile Server (VMS) as mobile cloud server when Internet Protocol (IP) connection is established to said mobile cloud clients,
  b) reporting IP addresses of said mobile cloud clients to said VMS in Terminal Clients IP Address Table of said VMS,
  c) always keeping said MT client(s) synchronized to said VMS when said MT client(s) have said IP connection,
  d) keeping other mobile cloud clients including said home computer clients, said home TV clients, said home A/V sub-server clients, said home IoT sub-server clients, said office computer clients, said office TV clients and said mobile laptop clients not synchronized to said VMS even though said other mobile cloud clients have said IP connections,
  e) synchronizing said VMS with specific said other mobile cloud client(s) after said MT client enables sharing request to said specific other mobile cloud client(s),
  f) keeping both said MT client and said specific other mobile cloud client(s) fully synchronized through said VMS and enabling said MT client to share applications, services and contents with said specific other mobile cloud client(s) after said specific other mobile cloud client(s) are synchronized to said VMS,
  g) closing synchronization of said VMS with said specific other mobile cloud client(s) after said MT client disables said sharing request to said specific other mobile cloud client(s), and
  h) keeping said other mobile cloud clients connected to Internet, further to said VMS through said IP connection when said other mobile cloud clients are not synchronized to said VMS.

20. The method as recited in claim 19, wherein said sharing request refers to real-time sharing with full synchronization of said applications, services and contents between said MT client(s) and said other mobile cloud clients, and two-way interactive sharing of said real-time sharing provides private conferencing services among said mobile cloud clients or between said MT client(s) and said other mobile cloud clients.

* * * * *